US012609968B1

(12) United States Patent
Hammerle et al.

(10) Patent No.: US 12,609,968 B1
(45) Date of Patent: Apr. 21, 2026

(54) DYNAMIC PLAYBOOKS FOR SECURITY INVESTIGATIONS

(71) Applicant: Dropzone.ai, Inc., Seattle, WA (US)

(72) Inventors: Eric Joseph Hammerle, Kirkland, WA (US); Colin James Phillips, Kirkland, WA (US); Changhwan Oh, Shoreline, WA (US); Robert Rowland Foley, Long Island City, NY (US); Michael Francis Buono, McLean, VA (US)

(73) Assignee: Dropzone.ai, Inc., Seattle, WA (US)

( * ) Notice: Subject to any disclaimer, the term of this patent is extended or adjusted under 35 U.S.C. 154(b) by 0 days.

(21) Appl. No.: 19/394,206

(22) Filed: Nov. 19, 2025

(51) Int. Cl.
*H04L 9/40* (2022.01)
*G06F 21/00* (2013.01)

(52) U.S. Cl.
CPC .................................... *H04L 63/20* (2013.01)

(58) Field of Classification Search
CPC ....... H04L 63/20; H04L 63/30; H04L 63/302; H04L 63/14; H04L 63/1433; G06F 21/50; G06F 21/577; G06F 21/604
See application file for complete search history.

(56) References Cited

U.S. PATENT DOCUMENTS

| | | | |
|---|---|---|---|
| 7,330,817 B1 | 2/2008 | Exall et al. | |
| 9,363,149 B1 * | 6/2016 | Chauhan | H04L 43/045 |
| 9,600,659 B1 | 3/2017 | Bird et al. | |
| 10,198,433 B2 | 2/2019 | Weston et al. | |
| 10,666,666 B1 | 5/2020 | Saurabh | |

| | | |
|---|---|---|
| 10,694,026 B2 | 6/2020 | Chandrasekaran et al. |
| 11,916,767 B1 | 2/2024 | Wu et al. |
| 11,943,387 B1 | 3/2024 | Wolinsky et al. |
| 11,960,515 B1 | 4/2024 | Pallakonda et al. |
| 12,008,332 B1 | 6/2024 | Gardner et al. |
| 12,034,616 B1 | 7/2024 | Wu et al. |
| 12,105,746 B1 | 10/2024 | Wu et al. |

(Continued)

FOREIGN PATENT DOCUMENTS

| | | |
|---|---|---|
| CN | 115981240 B | 6/2023 |
| WO | 2025/029346 A1 | 2/2025 |

OTHER PUBLICATIONS

Office Communication for U.S. Appl. No. 18/230,123 mailed Sep. 25, 2023, 9 Pages.

(Continued)

*Primary Examiner* — Edward Zee
(74) *Attorney, Agent, or Firm* — John W. Branch; Branch Partners PLLC

(57) ABSTRACT

Embodiments are dynamic investigation playbooks. Events associated with activity in the computing environment may be obtained. Heritage playbooks may be collected based on characteristics of the events such that each heritage playbook includes heritage instructions for investigating the events. An analysis playbook may be obtained based on an analysis of the events such that the analysis playbook includes analysis instructions to automatically investigate the events. An updated analysis playbook may be obtained based on the analysis playbook and portions of the heritage playbooks such that the portions of the heritage playbooks may be included in the updated analysis playbook. An investigation of the events may be executed based on the updated analysis playbook such that actions may be executed based on the portions of the heritage playbooks.

20 Claims, 12 Drawing Sheets

(56)　　　References Cited

U.S. PATENT DOCUMENTS

| | | |
|---|---|---|
| 12,229,313 B1 | 2/2025 | Shastry et al. |
| 12,248,501 B1 | 3/2025 | Wu et al. |
| 12,489,778 B1 | 12/2025 | Hammerle et al. |
| 2003/0093276 A1 | 5/2003 | Miller et al. |
| 2013/0343205 A1 | 12/2013 | Dolan et al. |
| 2015/0347569 A1 | 12/2015 | Allen et al. |
| 2016/0171068 A1 | 6/2016 | Hardin |
| 2016/0342317 A1 | 11/2016 | Lim et al. |
| 2018/0240043 A1 | 8/2018 | Majumdar et al. |
| 2019/0138879 A1 | 5/2019 | Hu et al. |
| 2020/0184072 A1 | 6/2020 | Ikeda |
| 2020/0387816 A1 | 12/2020 | Rodriguez Bravo et al. |
| 2021/0174095 A1 | 6/2021 | Kong et al. |
| 2022/0263858 A1 | 8/2022 | Bargnesi et al. |
| 2022/0263860 A1 | 8/2022 | Crabtree et al. |
| 2022/0295008 A1 | 9/2022 | Nold et al. |
| 2022/0391595 A1 | 12/2022 | Shevelev et al. |
| 2023/0208971 A1 | 6/2023 | Te Booij et al. |
| 2023/0244869 A1 | 8/2023 | Neumann |
| 2023/0359789 A1 | 11/2023 | Andre et al. |
| 2024/0045990 A1 | 2/2024 | Boyer et al. |
| 2024/0054233 A1 | 2/2024 | Ohayon et al. |
| 2024/0070251 A1 | 2/2024 | Maizels et al. |
| 2024/0098105 A1 | 3/2024 | Kanady et al. |
| 2024/0134865 A1 | 4/2024 | Bierner et al. |
| 2024/0260892 A1 | 8/2024 | Haas et al. |
| 2024/0281472 A1 | 8/2024 | Larhette et al. |
| 2024/0291779 A1 | 8/2024 | Catalano et al. |
| 2024/0291853 A1 | 8/2024 | Murphy et al. |
| 2024/0323152 A1 | 9/2024 | Rosenberg et al. |
| 2024/0355337 A1 | 10/2024 | Altaf et al. |
| 2024/0363099 A1 | 10/2024 | Altaf et al. |
| 2024/0363103 A1 | 10/2024 | Altaf et al. |
| 2024/0393750 A1 | 11/2024 | Malladi et al. |
| 2024/0402664 A1 | 12/2024 | Sudhakar et al. |
| 2024/0403416 A1 | 12/2024 | Sharpe et al. |
| 2024/0403634 A1 | 12/2024 | Hawes et al. |
| 2024/0411994 A1 | 12/2024 | Siracusano et al. |
| 2024/0412031 A1 | 12/2024 | Rayman |
| 2024/0412839 A1 | 12/2024 | Tang et al. |
| 2024/0414211 A1 | 12/2024 | Boyer et al. |
| 2025/0037107 A1 | 1/2025 | Abdelrahman et al. |
| 2025/0047578 A1 | 2/2025 | Wu et al. |
| 2025/0053273 A1 | 2/2025 | Uva |
| 2025/0209156 A1 | 6/2025 | Sankaran et al. |
| 2025/0342184 A1 | 11/2025 | Wu et al. |

OTHER PUBLICATIONS

Office Communication for U.S. Appl. No. 18/230,123 mailed Dec. 12, 2023, 22 Pages.

Office Communication for U.S. Appl. No. 18/587,712 mailed May 14, 2024, 14 Pages.

Office Communication for U.S. Appl. No. 18/652,093 mailed Jul. 31, 2024, 21 Pages.

Office Communication for U.S. Appl. No. 18/753,778 mailed Sep. 5, 2024, 16 Pages.

International Search Report and Written Opinion for International Patent Application No. PCT/US2024/028612 mailed Aug. 6, 2024, 14 Pages.

Sreake Division, "Achieving operational efficiency in Kubernetes with ChatGPT-4: Troubleshooting", Three Shakes Inc., Blog; May 23, 2023, 57 pages.

Fixpoint Inc., "Decision to release fault notification service using LLM", PR Times, Jul. 18, 2023, 4 pages.

Office Communication for U.S. Appl. No. 18/902,566 mailed Dec. 6, 2024, 21 Pages.

Office Communication for U.S. Appl. No. 18/753,778 mailed Dec. 30, 2024, 10 Pages.

Office Communication for U.S. Appl. No. 18/753,778 mailed Mar. 20, 2025, 4 Pages.

Office Communication for U.S. Appl. No. 18/978,990 mailed Mar. 12, 2025, 23 Pages.

Office Communication for U.S. Appl. No. 18/753,778 mailed Apr. 23, 2025, 11 Pages.

Office Communication for U.S. Appl. No. 18/978,990 mailed Jul. 7, 2025, 18 Pages.

Office Communication for U.S. Appl. No. 18/753,778 mailed Sep. 18, 2025, 10 Pages.

Office Communication for U.S. Appl. No. 18/978,990 mailed Sep. 30, 2025, 4 Pages.

Office Communication for U.S. Appl. No. 19/296,689 mailed Oct. 24, 2025, 10 Pages.

Office Communication for U.S. Appl. No. 19/296,653 mailed Nov. 3, 2025, 9 Pages.

Office Communication for U.S. Appl. No. 19/296,653 mailed Nov. 14, 2025, 2 Pages.

* cited by examiner

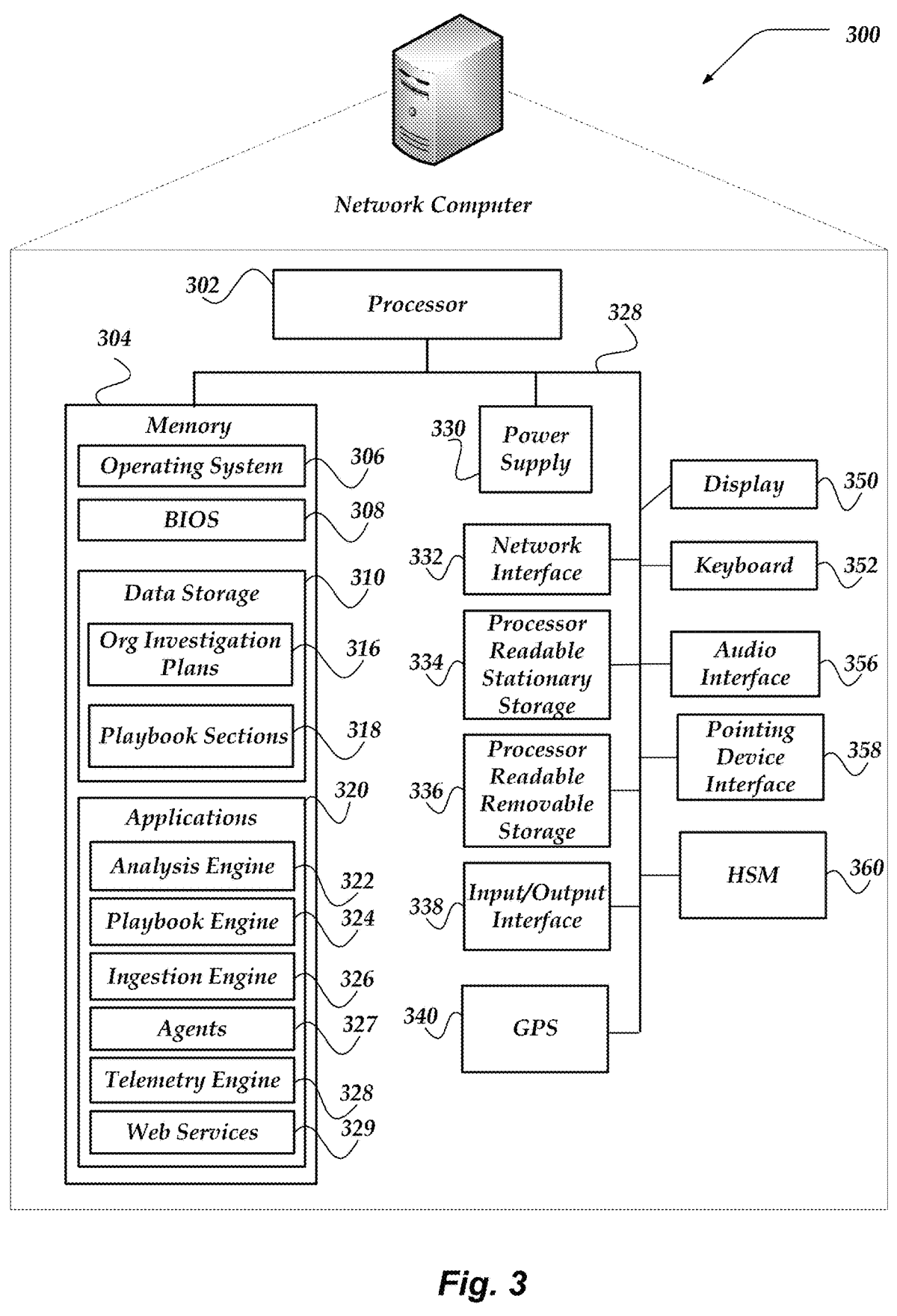

_Network Computer_

_300_

302 — _Processor_     328

304 — _Memory_

330 — _Power Supply_

Memory

_Operating System_ — 306

_BIOS_ — 308

Data Storage — 310

_Org Investigation Plans_ — 316

_Playbook Sections_ — 318

Applications — 320

_Analysis Engine_ — 322

_Playbook Engine_ — 324

_Ingestion Engine_ — 326

_Agents_ — 327

_Telemetry Engine_ — 328

_Web Services_ — 329

332 — _Network Interface_

334 — _Processor Readable Stationary Storage_

336 — _Processor Readable Removable Storage_

338 — _Input/Output Interface_

340 — _GPS_

_Display_ — 350

_Keyboard_ — 352

_Audio Interface_ — 356

_Pointing Device Interface_ — 358

_HSM_ — 360

_Fig. 3_

DYNAMIC PLAYBOOKS FOR SECURITY INVESTIGATIONS

TECHNICAL FIELD

These innovations relate generally to computer associated security, and more particularly, but not exclusively, to dynamic playbooks for security investigations.

BACKGROUND

As organizations become increasingly dependent on heterogenous computer environments that may include complex networks, remote services, distributed services, or the like, managing and monitoring infrastructure access in such computing environments can become both increasingly critically important and increasingly complex. Difficulties associated with managing computing environments may not be new, however, interconnections among remote offices, data centers, remote employees, remote customers, and so on, have resulted in organizations relying more broadly on heterogeneous distributed services, or the like. To help manage their information technology infrastructure, organizations have developed various strategies to protect their technology and infrastructure from direct threats or indirect threats. One common practice is for organization to internally developed collection of checklists or instructions regarding responding or investigation various security events or security incidents. Overtime organizations may develop a reliance on such checklists or instructions based on historical success or familiarity. However, in some cases, reliance on such collections of instructions or checklists may introduce unwanted risk as the instruction or checklists become stale or neglected such that they may become less reliable or relevant. However, historical success, familiarity, or past successes may breed a reluctance to modify existing instructions or checklists or introduce new instructions or checklists. Thus, it is with respect to these considerations and others that these present innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein:

FIG. 3 illustrates a schematic embodiment of a network computer;

DETAILED DESCRIPTION OF VARIOUS EMBODIMENTS

Figure 1:
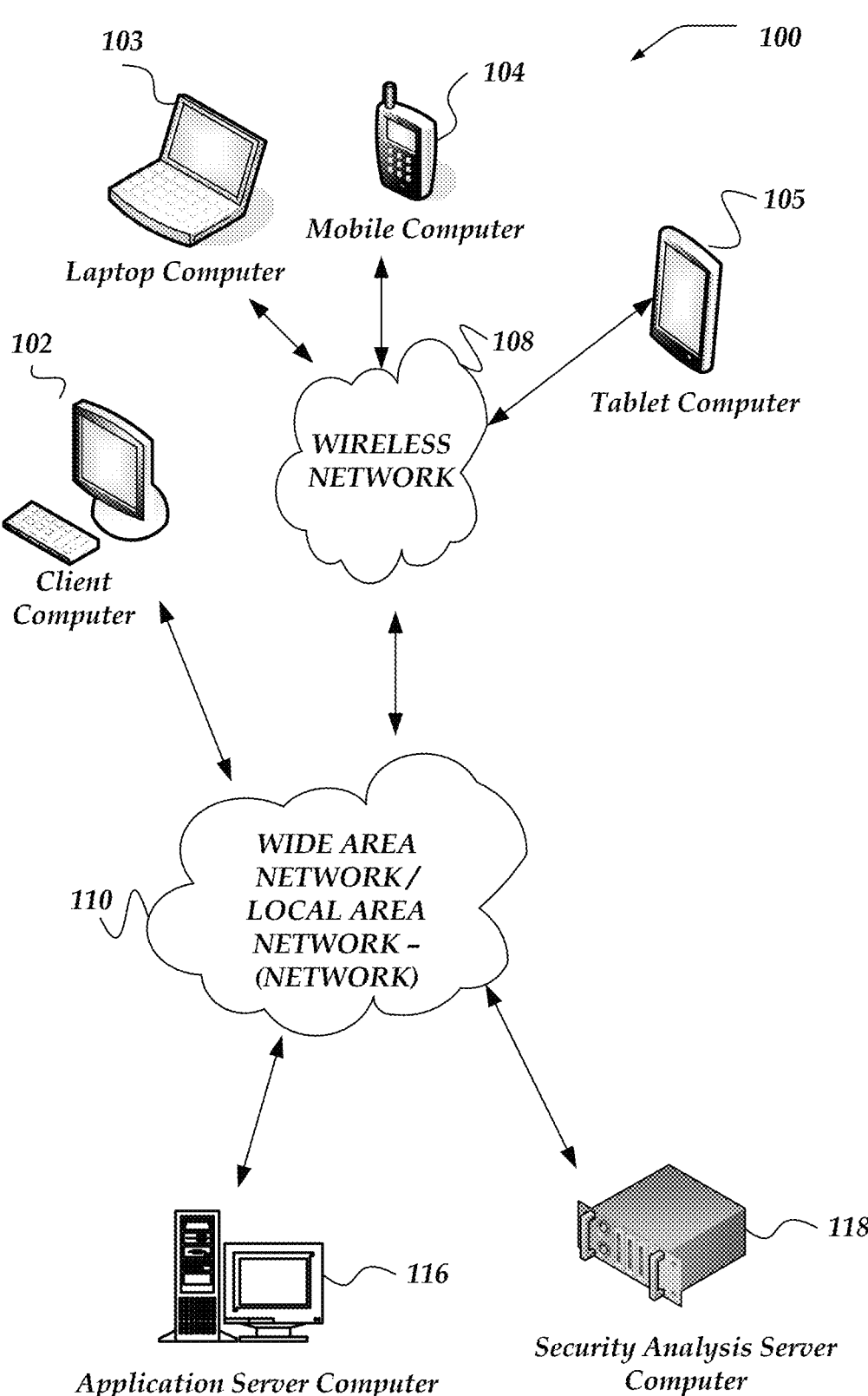
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which these innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of these innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example, embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java, PHP, Perl, Python, R, *Julia*, JavaScript, Ruby, VBScript, Microsoft.NET languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the terms "large language model," or "LLM" refer to data structures, programs, or the like, that may be trained or designed to perform a variety of natural language processing tasks. Typically, LLMs may generate text responses in response to text based prompts. Often, LLMs may be considered to be neural networks that have been trained on large collections of natural language source documents. Accordingly, in some cases, LLMs may be trained to generate predictive responses based on provided prompts. LLM prompts may include context information, examples, or the like, that may enable LLMs to generate responses directed to specific queries or particular problems that go beyond conventional NLP.

As used herein, the terms "prompt, or" prompt dataset" refer to one or more data structures that contain or represent prompt information that may be provided to LLMs.

As used herein, the term "event," or "event information" as used herein refer one or more data structures or messages that may report alerts, outcomes, conditions, or occurrences that may be detected or observed in a networked computing environment. Event information may include additional context information associated with an event, such as event source, event type, or the like. Organizations may deploy various systems that may be configured to monitor various types of events depending on needs of an industry or technology area. For example, information technology services may generate events in response to one or more conditions, such as, computers going offline, memory over-utilization, CPU over-utilization, storage quotas being met or exceeded, applications failing or otherwise becoming unavailable, networking problems (e.g., latency, excess traffic, unexpected lack of traffic, intrusion attempts, or the like), electrical problems (e.g., power outages, voltage fluctuations, or the like), customer service requests, or the like, or combination thereof. Events may be provided using one or more messages, emails, telephone calls, library function calls, application programming interface (API) calls, including any signals provided to indicate that an event has occurred. One or more third party and/or external systems may be configured to generate event messages.

As used herein, the terms "generative artificial intelligence," "generative AI," refer to data structures, models, programs, services, or the like that may be trained or designed to perform a variety of data analysis tasks. Typically, generative AI systems may generate responses in response to provided prompts. Often, generative AI may be considered to include neural networks or transformers that have been trained or tuned on large collections of training documents. Accordingly, in some cases, generative AI may be trained to generate predictive responses based on provided prompts. Generative AI prompts may include context information, examples, or the like, that may enable generative AIs to generate responses directed to specific queries or particular problems that go beyond conventional machine learning or other conventional techniques. In some cases, generative AI may include or be referred to as large language models (LLMs). Note, innovation herein should not be considered to be limited to using particular generative AI modeling techniques as these are anticipated to change or evolve overtime.

As used herein, the term "heritage playbook" refers to one or more data structures, documents, or procedural frameworks that contain pre-existing organizational investigation procedures, legacy response protocols, compliance requirements, manual investigation checklists, or regulatory obligations that organizations may have developed separately or prior to deploying automated investigation systems. Heritage playbooks may include natural language instructions, operational runbooks, industry best practices, security team documentation, incident response procedures, compliance frameworks, or the like that represent established organizational knowledge and procedural requirements. Heritage playbooks may be stored in various formats including documents, databases, spreadsheets, configuration management systems, or policy repositories, and may require translation into machine-readable investigation directives for integration with automated analysis systems. Heritage playbooks may be associated with particular event types, organizational policies, regulatory mandates, or investigative scenarios based on matching criteria, relevance assessments, or organizational requirements.

As used herein, the term "analysis playbook" refers to one or more machine-readable data structures that include investigation directives, automated analysis instructions, agent prompts for generative artificial intelligence systems, evaluation criteria for threat assessment, data collection strategies, analysis methodologies, reporting requirements, or escalation procedures designed to guide automated security investigations. Analysis playbooks may be dynamically generated, modified, or enhanced based on event classifications, threat intelligence correlations, organizational security policies, investigation templates, or heritage playbook integration. Analysis playbooks may include instructions for querying external threat intelligence services, executing behavioral analysis algorithms, collecting system metrics, evaluating user authentication activity, performing network traffic analysis, or coordinating with internal or external evaluation services. Analysis playbooks may be configured to incorporate heritage playbook sections, procedural requirements, compliance obligations, or organizational knowledge to ensure comprehensive investigation coverage while maintaining automated analysis capabilities.

As used herein, the term, "configuration information" refers to information that may include rule based policies, pattern matching, scripts (e.g., computer readable instructions), or the like, that may be provided from various sources, including, configuration files, databases, user input, built-in defaults, or the like, or combination thereof. In some cases, configuration information may include or reference information stored in other systems or services, such as, configuration management databases, Lightweight Directory Access Protocol (LDAP) servers, name services, public key infrastructure services, or the like.

The following briefly describes embodiments of these innovations to provide a basic understanding of some aspects of these innovations. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to dynamic investigation playbooks. In one or more of the various embodiments, one or more events associated with activity in the computing environment may be obtained.

In one or more of the various embodiments, one or more heritage playbooks may be collected based on one or more characteristics of the one or more events such that each heritage playbook includes one or more heritage instructions for investigating the one or more events.

In one or more of the various embodiments, an analysis playbook may be obtained based on an analysis of the one or more events such that the analysis playbook includes one or more analysis instructions to automatically investigate the one or more events.

In one or more of the various embodiments, an updated analysis playbook may be obtained based on the analysis playbook and one or more portions of the one or more heritage playbooks such that the one or more portions of the heritage playbook may be included in the updated analysis playbook.

In one or more of the various embodiments, an investigation of the one or more events may be executed based on the updated analysis playbook such that one or more actions may be executed based on the one or more portions of the one or more heritage playbooks.

In one or more of the various embodiments, a user interface that includes one or more display panels may be obtained for content that includes one or more of an investigation report, a recommendation, or other information associated with the one or more events such that the content may be dynamically transformed and arranged for display to a user based on one or more of user interaction telemetry, user feedback or telemetry metrics.

In one or more of the various embodiments, obtaining the updated analysis playbook may include: obtaining one or more enhanced prompts that may include one or more heritage playbook sections and one or more analysis instructions such that the one or more enhanced prompts include one or more of a threat assessment template, an investigation guidance framework, or an analytical reasoning structure; using the one or more enhanced prompts with one or more generative artificial intelligence models to obtain one or more investigation directives for the updated analysis playbook; or the like.

In one or more of the various embodiments, collecting the one or more heritage playbooks may include: obtaining a plurality of heritage playbooks from one or more sources including one or more of a legacy incident response document, a compliance framework repository, a security team checklist database, a regulatory requirement documentation system, or the like; collecting the one or more heritage playbooks from the plurality of heritage playbooks based on the one or more characteristics of the one or more events based on one or more relevance assessments; or the like.

In one or more of the various embodiments, one or more duplicate heritage instructions may be collected based on similarity analysis between the one or more heritage playbooks and the analysis playbook such that the one or more duplicate heritage instructions may include one or more of a redundant investigation step, an overlapping data collection requirement, a repetitive analysis directive, or the like; deduplicating the one or more duplicated heritage instructions; or the like.

In one or more of the various embodiments, obtaining the updated analysis playbook may further include: translating one or more natural language heritage instructions from the one or more heritage playbooks into machine-readable investigation directives using one or more of a natural language processing action or a generative artificial intelligence model; obtaining one or more agent prompts based on the translated heritage instructions for integration into the investigation of the one or more events; or the like.

In one or more of the various embodiments, one or more heritage playbook value profiles that track effectiveness metrics for one or more sections of the one or more heritage playbooks may be obtained such that the one or more heritage playbook value profiles include one or more of an execution success rate, a cost-benefit ratio, an investigation contribution score, a user feedback rating, or the like; using the one or more heritage playbook value profiles to prioritize inclusion of the one or sections of the more heritage playbooks in the updated analysis playbook.

In one or more of the various embodiments, one or more heritage playbook evaluation criteria may be obtained that include one or more of an age threshold, a usage frequency metric, user satisfaction score, a compliance requirement indicator, or the like; using the one or more heritage playbook evaluation criteria to identify one or more heritage playbook sections that may be eligible to include in the analysis playbook, or the like.

In one or more of the various embodiments, obtaining one or more heritage playbook versioning systems to track modifications and evolution of heritage playbook content over time such that the one or more heritage playbook versioning systems may include one or more of a change history record, a rollback capability, a concurrent modification management feature, or the like; using the one or more heritage playbook versioning systems to maintain consistency between heritage playbook sources and integrated analysis playbook content, or the like.

Illustrated Operating Environment

FIG. 1 shows components of one embodiment of an environment in which embodiments of the innovations disclosed herein may be practiced. Not all of the components may be required to practice these innovations, and variations in the arrangement and type of the components may be made without departing from the spirit or scope of these innovations. As shown, system 100 of FIG. 1 includes local area networks (LANs)/wide area networks (WANs)—(network) 110, wireless network 108, client computers 102-105, application server computer 116, security analysis server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), extensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, application server computer 116, security analysis server computer 118, or other computers.

Client computers 102-105 may further be configured to include a client application that enables an end-user to log into an end-user account that may be managed by another computer, such as application server computer 116, security analysis server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Further, client computers may be arranged to enable users to provide configuration information, policy information, or the like, to security analysis server computer 118. Also, client computers may be arranged to enable users to display reports, interactive user-interfaces, results provided by security analysis server computer 118, or the like. Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, application server computer 116, security analysis server computer 118, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information using one or more network protocols, such Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

One embodiment of application server computer 116, and security analysis server computer 118 are described in more detail below in conjunction with FIG. 3. Although FIG. 1 illustrates application server computer 116, or security analysis server computer 118 each as a single computer, the innovations or embodiments are not so limited. For example, one or more functions of application server computer 116, or security analysis server computer 118, or the like, may be distributed across one or more distinct network computers. Moreover, in one or more embodiments, security analysis server computer 118 may be implemented using a plurality of network computers. Further, in one or more of the various embodiments, application server computer 116, or security analysis server computer 118 may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
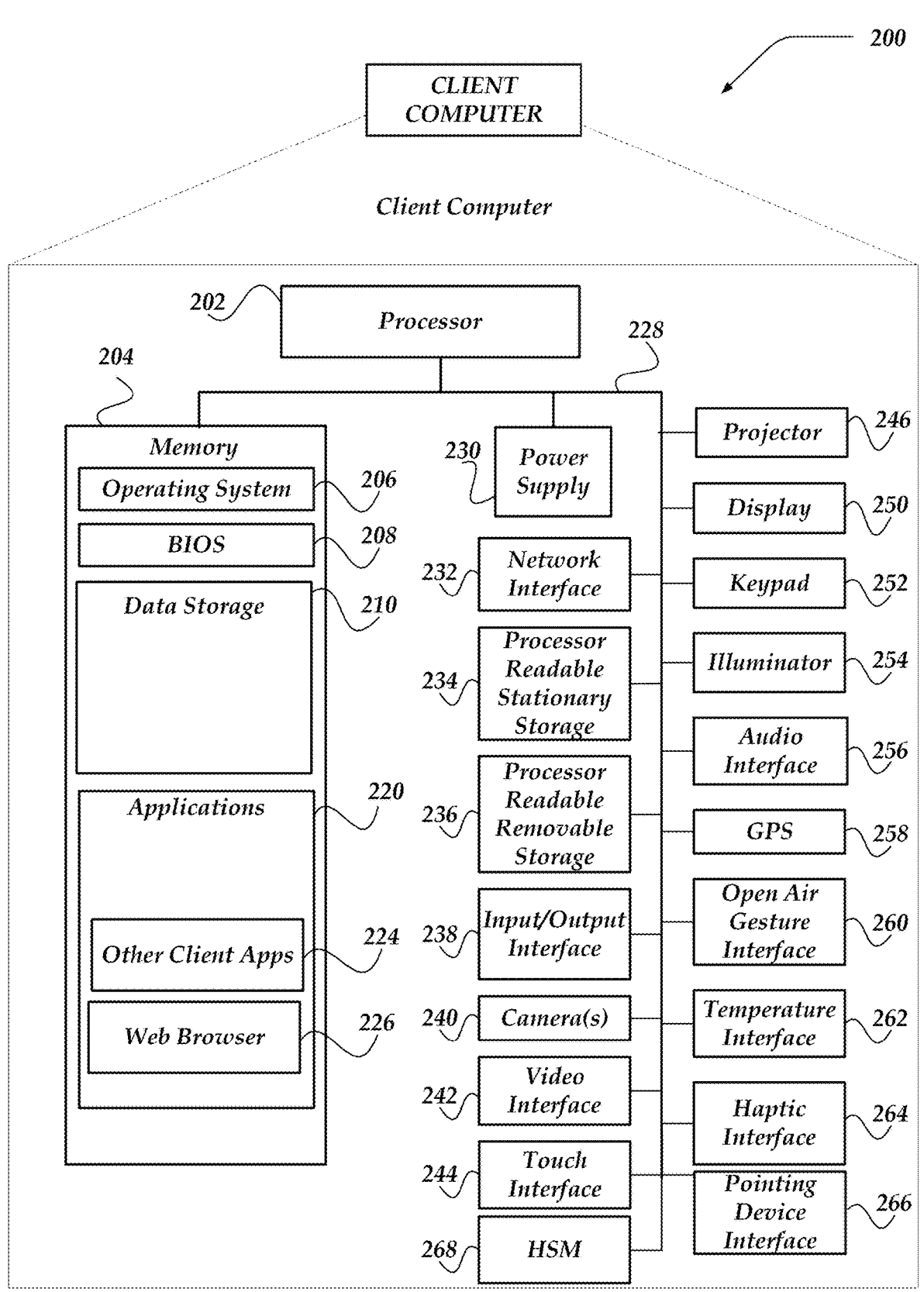
FIG. 2 illustrates a schematic embodiment of a client computer.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 for measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

nication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geopositioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth, Zigbee, or the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), extensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX®, or Linux®, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by processors, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, queries, searches, messages, notification messages, event messages, alerts, log data, API calls, or the like, combination thereof, with application servers. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware devices may directly execute embedded logic to perform actions. Also, in one or more embodiments (not shown in the figures), client computer 200 may include one or more hardware microcontrollers instead of CPUs. In one or more embodiments, the microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Network Computer

FIG. 3 shows one embodiment of network computer 300 that may be included in a system implementing at least one of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of application server computer 116, security analysis server computer 118 shown in FIG. 1.

As shown in the figure, network computer 300 includes a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300. In some embodiments, processor-readable stationary storage device 334 or processor-readable removable storage device 336 may be considered a processor or computer readable non-transitory storage media that includes instructions configured for obtaining dynamic investigation playbooks in a computing environment such that execution of the instructions by one or more processors on one or more network computers performs actions described herein.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiment, however, network computer 300 may, through other components, provide other information that may be employed to determine a physical location of the network computer or client computers, including for example, a Media Access Control (MAC) address, IP address, and the like.

In at least one of the various embodiments, applications, such as, operating system 306, analysis engine 322, playbook engine 324, ingestion engine 326, agents 327, telemetry engine 328, web services 329, or the like, may be arranged to employ geo-location information to select one or more localization features, such as, time zones, languages, currencies, calendar formatting, or the like. Also, localization features may be used when interpreting network traffic, application protocols, user-interfaces, generating reports, monitoring infrastructure access in different regions, or the like. Localization may be employed by one or more internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores operating system 306 for controlling the operation of network computer 300. It will be appreciated that this component may include a general-purpose operating system such as a version of UNIX®, or Linux®, or a specialized operating system such as Microsoft Corporation's Windows® operating system, or the Apple Corporation's IOS operating system. Operating systems may include, or interface with a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, investigation plans 316, playbook sections 318, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include analysis engine 322, playbook engine 324, ingestion engine 326, agents 327, telemetry engine 328, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, analysis engine 322, playbook engine 324, ingestion engine 326, agents 327, telemetry engine 328, web services 329, or the like, may be operative in a cloud-based computing environment. In one or more of the various embodiments, these applications, and others may be executing within virtual machines or virtual servers that may be managed in a cloud-based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to analysis engine 322, playbook engine 324, ingestion engine 326, agents 327, telemetry engine 328, web services 329, or the like, may be provisioned and de-commissioned automatically.

Also, in one or more of the various embodiments, analysis engine 322, playbook engine 324, ingestion engine 326, agents 327, telemetry engine 328, web services 329, or the like, may be located in virtual servers running in a cloud-based computing environment rather than being tied to one or more specific physical network computers. Likewise, in some embodiments, one or more of analysis engine 322, playbook engine 324, ingestion engine 326, agents 327, telemetry engine 328, web services 329, or the like, may be configured to execute in a container-based environment.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security modules may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include one or more embedded logic hardware devices instead of CPUs, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of CPUs. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
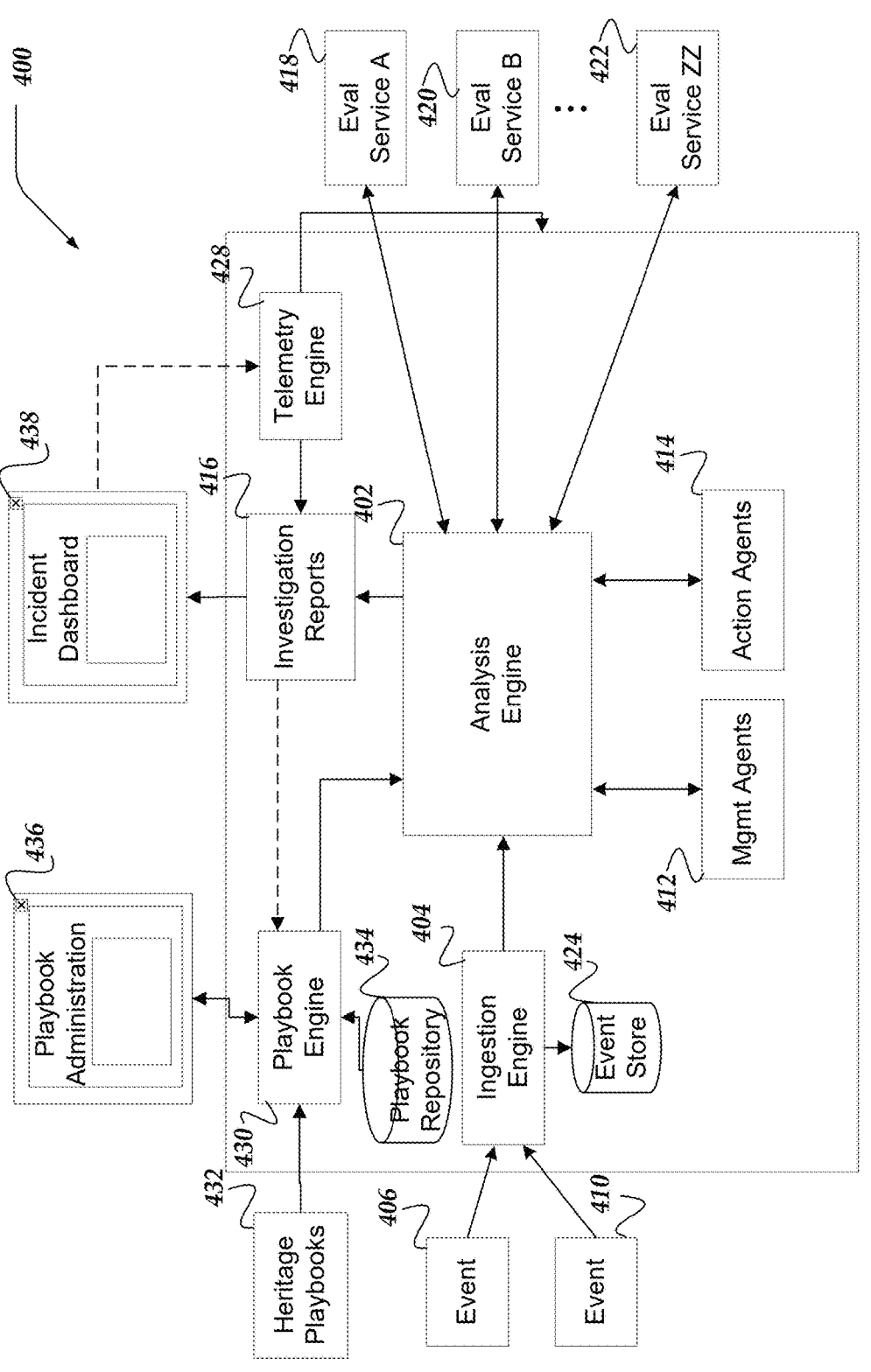
FIG. 4 illustrates a logical architecture of a system for dynamic playbooks for security investigations in accordance with one or more of the various embodiments.

FIG. 4 illustrates a logical architecture of system 400 for dynamic playbooks for security investigations in accordance with one or more of the various embodiments.

In one or more of the various embodiments, analysis engines, such as analysis engine 402 may be provided one or more events, such as event 406, event 410, or the like, via an ingestion engine, such as, ingestion engine 404. Accordingly, in some embodiments, as event information may be ingested, analysis engines may be arranged to employ one or more agents, such as, management agents 412, action agents 414, or the like, to evaluate or investigate the events to determine if the events may be events that may be worthy of taking notice. Thus, in some embodiments, analysis engines may be arranged to generate one or more reports, such as, investigation reports 416 that may include information about the one or more events based on the evaluation. Also, in some embodiments, investigation reports may include information about the various actions executed by the analysis engine. In some embodiments, this may include one or more recommendations for one or more actions, including recommending one or more remedial actions for responding to the events or resolving associated issues or incidents associated with various types of incidents, such as intrusion events, denial of service incidents, data breaches, or the like. For example, for some embodiments, investigation report may recommend that one or more computers or applications be quarantined, locking one or more users out of the network, or the like.

In one or more of the various embodiments, agents, including management agents 412 or action agents 414 may be arranged to communicate with one or more internal or external services that may contribute to the evaluation of events. In this example, for some embodiments, service 418, service 420, or service 422 may be considered to represent one or more internal or external (e.g., third-party SaaS) evaluation services.

In one or more of the various embodiments, organizations may conventionally deploy computing environments that may include various services, applications, devices, systems, or the like, that may monitor various features or metrics associated with their computing infrastructure. In some cases, multiple applications or services may be configured to generate event information, such as log entries, event notifications, alarms, alerts, or the like, that may be relevant to the particular applications or services. Also, in some embodiments, organizations may employ one or more dedicated monitoring tools that may be configured to generate event information associated with various conditions or activity that may occur in the monitored environments. Further, in some embodiments, organizations may deploy one or more network devices that monitor network activity, enforce access policies, balance workloads, or the like. Also, in some embodiments, many organizations may include one or more customized monitoring or alerting systems that may be directed to generating event information associated with their particular operating environments. In general, in some embodiments, organizations may configure their networking environments or computing environments to automatically generate an arbitrary number of events or event information depending on their local requirements or local circumstances. Note, herein computing environments may be alternatively described using terms such as networked environments, monitored networks, or the like. For brevity and clarity these terms may be considered to be computing environments and are not restricted to networks, networked environments, or the like. Also, in some cases, the innovations disclosed herein may be practiced using a single computer or computing device.

In some cases, organizations may be faced with interpreting or processing many events or different event types generated by various sources within or associated with their computing/networking environments. Accordingly, in some cases, administrators may be overwhelmed by the sheer number of events coming from these many sources. Also, in some embodiments, commonly some (or many) events may be considered false positives in that they may be safely ignored, or they may be incorrectly reporting a safe signal or safe condition as being unsafe.

Further, in some cases, modern computing environments may often be dynamic with computers (e.g., virtual computers, container-based services, personal computing devices) joining or leaving the networks. Similarly, in some embodiments, networks for some organizations may dynamically be adding physical devices, services, applications, or the like, depending on local circumstances or local requirements.

Accordingly, conventionally, in some cases, organizations may be required to manually determine which events may be considered actionable. In this case, manual determination may include the creation or deployment of filters, classifiers, or the like, that are directed to particular known false positive events. However, in some cases, administrators for organizations may be required to validate/verify many events to determine which events may be false positives. Further, in some cases, such classification may require administrators to perform a wide-variety of ad-hoc operations to track down the source of the event or the source of the circumstances or conditions that may have triggered the event in the first place.

Conventionally, in some cases, administrators may be required to manually employ different internal services or external services that may help classify incoming events. Further, in some cases, different administrators may approach event classification differently from one another such that different administrators may perform different actions or perform actions in an order of operation different from other administrators. Accordingly, in some cases, the veracity or quality of event classification may vary depending on personal preferences or individual biases rather than objective criteria or operations.

Accordingly, in some embodiments, events, such as, event 406 or event 410 may be provided to an ingestion engine, such as ingestion engine 404. In some embodiments, ingestion engines may be arranged to import event information from various sources, such as application/system health monitoring services, network security monitoring services, application log files, event aggregators, or the like. Accordingly, in some embodiments, ingestion engines may be arranged to employ one or more filters, parsers, transformers, interfaces, libraries, or the like, that may be directed to particular event sources. In some embodiments, ingestion engines may be arranged to associate one or more ingestion protocols or ingestion tools with particular event sources. For example, in some embodiments, an event aggregation application may publish an API that ingestion engines may employ to collect events. Likewise, for example, ingestion engines may be arranged to employ a custom log file parser that is directed to a customized event logging system. Accordingly, in some embodiments, ingestion engines may be arranged to employ instructions, filters, parsers, transformers, interfaces, libraries, or the like, provided or determined via configuration information for ingesting events. Thus, in some embodiments, ingestion engines may be arranged to be adaptable to local requirements or local circumstances that may change over time.

In one or more of the various embodiments, ingestion engine 404 may be arranged to store event information in a data store, such as event store 424. Accordingly, in some embodiments, analysis engines may be provided a historical record of some or all events or event information that have been ingested by ingestion engines.

In one or more of the various embodiments, analysis engine 402 may be arranged to evaluate some or all events to determine if some events may be ignored or otherwise automatically resolved while other events may be determined to require human intervention or otherwise be escalated. One of ordinary skill in the art will appreciate that classifying events may include categorizing events into two or more categories depending on local requirements or local circumstances. Accordingly, for brevity and clarity, analysis engines are described in terms of classifying events as false positive events or positive events, however, innovations disclosed herein are not so limited and analysis engines may be arranged to classify events using classification schemes that go beyond binary classification.

Also, in some embodiments, analysis engines may be arranged to associate, determine, or collect various scores, such as severity scores, priority scores, risk-scores, or the like for events. In some cases, analysis engines may be arranged to generate prompts or enhance existing prompts for use by one or more agents for conducting some or all of the analysis operations.

In some embodiments, analysis engines may be arranged to employ one or more management agents, such as, management agents 412 to begin or manage the operations executed to classify events, collect event information, initialize analysis playbooks, or the like. In some embodiments, management agents may work with one or more action agents, such as action agents 414. In some embodiments, action agents may be arranged to perform one or more particular tasks as part of evaluating events. In some embodiments, action agents may be configured to select some or all of the actions based on analysis playbooks.

In some embodiments, management agents or action agents may be arranged to direct analysis engines to access various internal services or external services to analyze events. In this example, for some embodiments, evaluation service 418, evaluation service 420, or evaluation service 422 may be considered to represent one or more internal services or external services that may be employed to contribute to the analysis of events. For example, in some embodiments, an action agent may direct the analysis engine to use an external service to provide a risk-score or other information about a network address associated with an event. Accordingly, for some embodiments, an action agent may generate instructions that include one or more API calls to internal or external services to provide supplemental evaluation for event classification. Also, in some embodiments, one or more action agents may be arranged to execute APIs of internal services or external services directly from within the agents rather than relying on the analysis engine to execute the API calls.

In one or more of the various embodiments, if one or more events have been classified or otherwise investigated, analysis engines may be arranged to generate one or more reports, such as investigation reports 416. In some embodiments, investigation reports may be considered machine-readable information that other reporting tools or reporting services may employ to generate reports, visualizations, interactive reports, or the like. Also, in some embodiments, ingestion engines, playbook engines, analysis engines, or the like may be arranged to generate one or more user interfaces that enable interactive reports to be presented using data or other information included in investigation reports 416.

Also, in some embodiments, system 400 may be arranged to include one or more telemetry engines, such as telemetry engine 428. As described in more detail below, telemetry engines may be arranged to monitor user interactions, collect interaction metrics, telemetry associated metrics, or the like for enabling dynamic adaptation of user interfaces or other components based on the collected telemetry information or telemetry metrics.

Also, in some embodiments, system 400 may be arranged to one or more user interfaces, such as user interface 436, user interface 438, or the like for dynamic playbooks for security investigations. In this example, for some embodiments, user interface 436 may be considered to represent a user interface for administration of playbooks that may be used for guiding or prescribing threat investigations, incident response activities, mitigation actions, or the like.

Also, in this example, for some embodiments, one or more other user interfaces may be obtained or generated, such as user interface 438 may be considered a user interface for monitoring incident investigations, incident analysis, or the like.

In some embodiments, user interfaces, such as user interface 436 or user interface 438 may be provided by other systems, services, or applications that may be integrated with analysis engines such that those systems, services, or applications may be provided incident information, event analysis information, investigation reports, or the like. For example, in some embodiments, analysis engines, playbook engines, or the like may be arranged to provide one or more APIs or interfaces that may be used to inform or power one or more external user interfaces.

In some embodiments, the one or more data structures that include the instructions, procedures, rules, criteria, prompts, prompt sections, pre-prompt information, or the like associated with responding to or investigating events or incidents may be referred to as analysis playbooks or playbooks for brevity. In general, analysis playbooks may be considered to include or provide as instructions, checklists, sequence lists, or the like for how events or incidents may be analyzed or invested. In some cases, particular playbooks may be designed or directed to one or more particular types of events or incidents. In this context, for some embodiments, playbooks may be considered to be machine readable such that analysis engines may use them to determine machine executable operations, steps, or actions for investigating events or security incidents.

In some embodiments, playbook engines or analysis engines may be arranged to dynamically generate playbooks based on an analysis of the events or other information associated with the events (e.g., event information may be considered the events and other associated information with an incident). In some embodiments, playbook engines may be arranged to assemble playbooks based on an analysis of the events associated with pending or potential incidents.

In some embodiments, playbook engines may be arranged to archive playbooks or other information associated with the execution of playbooks to provide documentation of various characteristics or aspects of the investigation, including analysis actions performed, mitigation steps performed, results associated with one or more evaluation services, or the like. Also, in some embodiments, playbook archives may include grades, scores, user feedback, user comments, or the like associated with playbooks or results that may be associated with playbooks.

Further, in some cases, organizations may have one or more conventional incident response playbooks (heritage playbooks) that were in use before system 400 was deployed for use by the organization. In some cases, these playbooks may be documents or workbooks that express the actions or requirements for responding to investigating one or more events or incidents. Herein, such conventional incident response playbooks may be referred to as heritage playbooks. Accordingly, for some embodiments, the heritage playbooks may be assumed to refer to the documents, databases, spreadsheets, or the like that include instructions, checklists, procedures an organization may have developed for responding to events or incidents. Often, the information included heritage playbooks may be represented in natural language or otherwise human readable forms or formats.

In some embodiments, playbook engines, such as playbook engine 430 may be arranged to obtain, collect, or import one or more heritage playbooks, represented here by heritage playbooks 432. Accordingly, in some embodiments, playbook engines may be arranged to incorporate some or all of the actions declared in heritage playbooks into the analysis playbooks used by analysis engines for investigating events or incidents. In some embodiments, playbook engines may be arranged to provide one or more user interfaces that enable users to select one or more heritage playbooks to ingest into system 400. In some embodiments, playbook engines may be configured to integrate via APIs or interfaces provided by document management systems, file systems, databases, or the like that may be storing heritage playbooks.

In some embodiments, playbook engines may be arranged to store information about some or all analysis playbooks in playbook repositories such as playbook repository 434. In some embodiments, playbook engines may be arranged to archive one or more previously used playbooks for future analysis, performance reviews, forensic reports, or the like. Further, in some embodiments, playbook repositories may be arranged to store portions of playbooks (e.g., playbook sections) that may include particularized instructions that may be selectively included in assembled playbooks.

In some embodiments, analysis engines may be arranged to automatically investigate events as the events may be ingested. In some embodiments, analysis engines may be arranged to initially classify or categorize events. In some cases, for some embodiments analysis engines may be configured to generate an initial analysis playbook based on the event type. Likewise, in some embodiments, event details, event information, historical results of investigations of similar events, or the like may be referred to select or configure the initial analysis playbooks.

In some embodiments, analysis engines may be arranged to augment the initial analysis playbooks with relevant heritage playbooks or heritage playbook sections. In some embodiments, the particular heritage playbooks or heritage playbook sections may be selected based on event information, event types, or the like, or combination thereof. Note, for brevity or clarity if the term heritage playbook is being used it may generally be assumed to represent heritage playbook sections as well as complete heritage playbooks.

In some embodiments, analysis engines or playbook engines may be arranged to enable organizations to configure rules to match one or more particular heritage playbooks or heritage playbooks sections to events or event types based on one or more various attributes or characteristics associated with the events. For example, in some embodiments, playbook engines or analysis engines may be arranged to enable organizations to associate one or more heritage playbooks with events based on various characteristics or features of the events, such as file system locations, application types, related users, user roles, or the like.

In some embodiments, analysis engines may be arranged to complete an initial or partial automated investigation of an event before determining if heritage playbooks may be implicated. Accordingly, in some embodiments, information collected during investigations may be employed to inform which if any heritage playbooks may be relevant to the pending investigation. In this example, for some embodiments, the dashed line connecting investigation reports 416 to playbook engine 430 represents how investigation reports or partial investigation reports may be provided to playbook engines for determining or collecting relevant heritage playbooks.

In some embodiments, one or more heritage playbooks may include one or more heritage playbook sections that may be indicated or inferred as being mandatory such that playbook engines may always include those heritage playbooks or sections in the analysis playbook. For example, an organization may desire to have a rule that the activity of every IT administrator be audited for particular events even though an initial analysis does not indicate IT administrators are associated with the events being investigated. Likewise, in some embodiments, heritage playbooks may include instructions to complete various actions to fulfill contractual or regulatory requirements that otherwise may be irrelevant to actual network security.

In some embodiments, analysis engines or playbook engines may be arranged to identify one or more heritage playbooks or heritage playbook sections that may be inferred to be irrelevant or otherwise unhelpful. Accordingly, in some embodiments, investigation reports may include entries or records that highlight the identified heritage playbooks or heritage playbook sections. In some embodiments, analysis engines or playbook engines may be arranged to provide one or more user interfaces that enable users to confirm or reject inferences, predictions, or recommendations that heritage playbooks or heritage playbook sections may be irrelevant. Accordingly, in some embodiments, heritage playbooks or heritage playbook sections confirmed as irrelevant may be omitted from future investigations if users confirm that they may be irrelevant. Likewise, for some embodiments, if the inference that a heritage playbook may be irrelevant may be rejected by an authorized user, playbook engines or analysis engines may be arranged to suppress such inferences in the future such that they may be omitted from investigation reports.

Further, in some embodiments, playbook engines, or the like may be arranged to evaluate the cost of performing instructions included heritage playbooks versus the success or value of the results. Accordingly, in some embodiments, playbook engines may develop a value profile for various heritage playbooks or heritage playbook sections based on the cost of executions versus value contributed to investigations. In some embodiments, playbook engines may be arranged to provide user interfaces that enable users to grade or score investigation results. In some embodiments, scoring may be enabled for particular results or actions associated with particular heritage playbooks. In some embodiments, heritage playbook value profiles may be organized or indexed based on event type, associated resources, associated users/user-roles, or the like. For example, an organization may have a heritage playbook section that was originally applied to every event or investigation. But, continuing with this example, if the playbook engine determines that this particular heritage playbook section only seems to produce valuable results for rarely encountered event types, playbook engines may be arranged to automatically omit these particular heritage playbook sections from investigations unless the investigations are associated with the relevant event types.

In some embodiments, heritage playbook value profiles may be data structures that store the various metrics associated with a heritage playbook. In some embodiments, as playbook engines or analysis engines may be intended to be adaptable to new events or event types, playbook engines or analysis engines may be arranged to employ instructions, rules, or the like provided via configuration information to determine the particular metrics that should be included in heritage playbook value profiles. In some embodiments, heritage playbook value profiles may be stored in heritage playbook repositories, or the like. In some embodiments, each heritage playbook may be associated with a heritage playbook value profile.

In some embodiments, playbook engines may be arranged to infer if one or more heritage playbooks or one or more heritage playbook sections may be redundant. Accordingly, in some embodiments, before including heritage playbooks in analysis playbooks or executing heritage playbook actions, playbook engines may evaluate if investigative or analysis actions declared in heritage playbooks may have been already executed. Likewise, in some embodiments, if two or more heritage playbooks or heritage playbook sections include redundant instructions, playbook engines may be arranged to suppress those sections for particular investigations.

In some embodiments, analysis engines or playbook engines may be arranged to generate or obtain user interfaces that enable users to manually inject instructions into analysis playbooks while investigations may be pending. Fox example, in some embodiments, a user may review pending (partial) investigation results and submit additional questions or statements that may be dynamically incorporated into active investigations or analysis playbooks.

In general, one of ordinary skill in the art will appreciate the organizations or their administrators may be enabled to create or configure playbooks that may be directed to arbitrary targets or goals. Further, in some embodiments, playbook engines may be arranged to score various playbooks based on various metrics, including age, number of times used, direct user feedback (e.g., scoring), quality of results, or the like.

Figure 5:
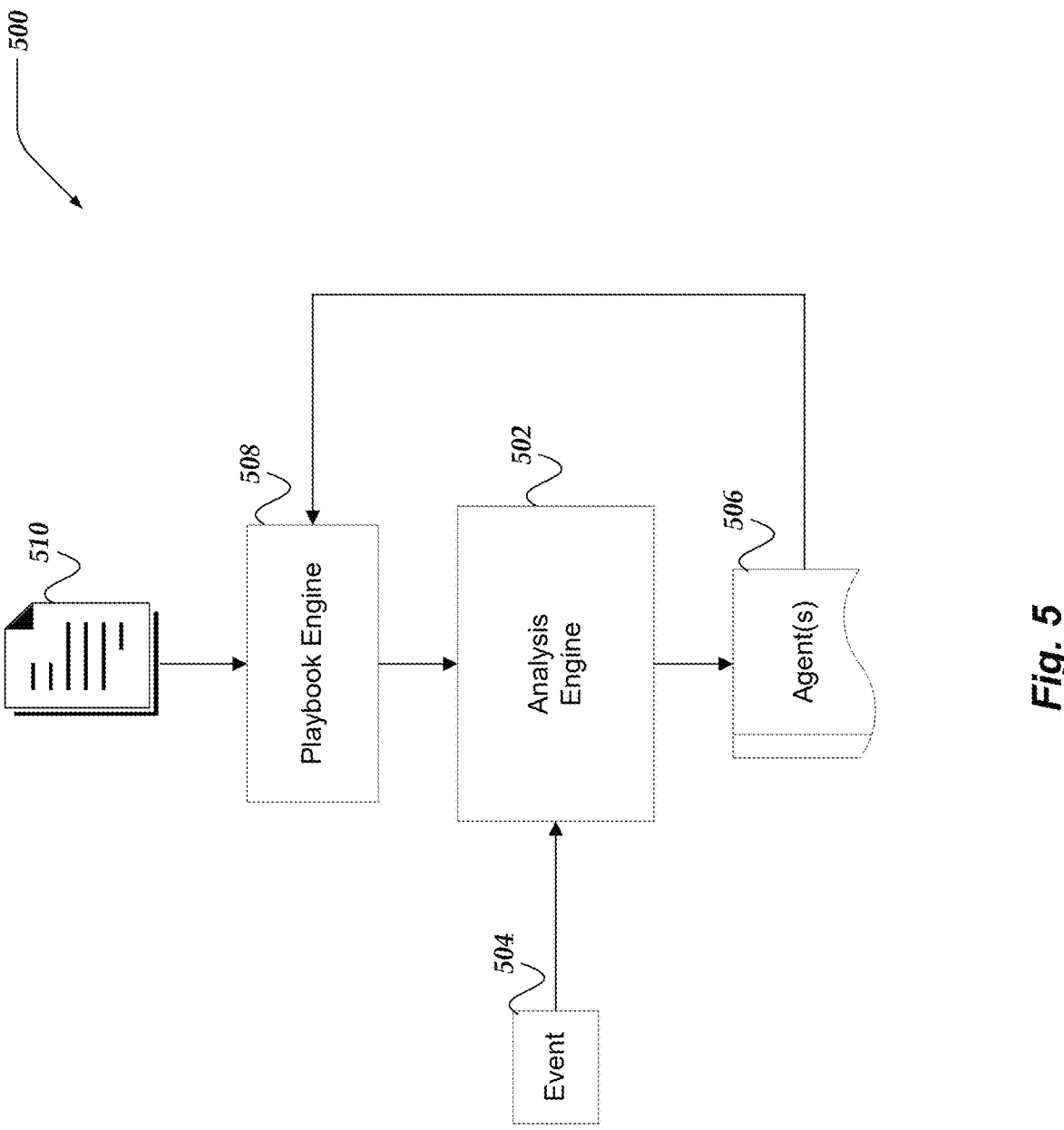
FIG. 5 illustrates a logical schematic of a system for dynamic playbooks for security investigations in accordance with one or more of the various embodiments.

FIG. 5 illustrates a logical schematic of system 500 for dynamic playbooks for security investigations in accordance with one or more of the various embodiments. In some embodiments, system 500 may be considered to represent how analysis engines or playbook engines may work iteratively to dynamically generate or update analysis playbooks during ongoing security investigations.

In some embodiments, analysis engine 502 may be arranged to investigate events, such as event 504 using analysis playbooks, such as analysis playbook 506. In some embodiments, event 504 may represent security events, incidents, alerts, threat indicators, or the like that may require investigation or analysis. In some embodiments, analysis playbook 506 may represent a machine-readable data structure that includes investigation instructions, analysis procedures, evaluation criteria, agent prompts, or the like that drive or guide the investigation of event 504.

In some embodiments, analysis engine 502 may be arranged to execute one or more initial investigation steps based on analysis playbook 506 to classify event 504, collect event information, identify associated entities, determine threat indicators, or the like. Accordingly, in some embodiments, analysis engine 502 may be arranged to provide investigation findings, partial results, event classifications, discovered entities, threat assessments, or the like to playbook engine 508 to enable dynamic playbook enhancement.

In some embodiments, playbook engine 508 may be arranged to evaluate the investigation information from analysis engine 502 to determine which heritage playbooks, such as heritage playbook 510 may be relevant to the pending investigation. In some embodiments, heritage playbook 510 may represent pre-existing organizational playbooks, legacy investigation procedures, compliance requirements, manual response protocols, or the like that organizations may have developed separately or prior to deploying automated investigation systems.

Accordingly, in some embodiments, playbook engine 508 may be arranged to analyze heritage playbook 510 using pattern matching algorithms, natural language processing, similarity scoring, machine learning classifiers, or the like to identify heritage playbook sections that may be applicable based on event types, investigation findings, entity associations, threat categories, organizational policies, or the like.

In some embodiments, playbook engines 508 may be arranged to generate prompts or other input information that may be provided generative AI systems for recommending the relevant heritage playbooks or heritage playbook sections. For example, in some embodiments, playbook engines may be arranged to include partial investigation reports with other context information in prompts that are directed to asking a generative AI system for recommended heritage playbooks or heritage playbook sections.

In some embodiments, playbook engine 508 may be arranged to incorporate selected heritage playbook sections into analysis playbook 506 such that the updated analysis playbook may include enhanced investigation steps, additional compliance requirements, organizational procedures, supplemental analysis criteria, or the like. In some embodiments, the incorporation process may include translating natural language heritage instructions into machine-readable investigation directives, generating agent prompts based on heritage procedures, mapping heritage requirements to automated analysis actions, or the like.

In some embodiments, the iterative process between analysis engine 502 or playbook engine 508 may continue throughout the investigation lifecycle such that analysis playbook 506 may be dynamically updated based on emerging investigation findings, newly discovered evidence, changing threat assessments, supplemental user input, contextual information, or the like. Accordingly, in some embodiments, analysis engine 502 may be arranged to provide updated investigation results to playbook engine 508 which may trigger additional heritage playbook evaluations, playbook section selections, analysis directive updates, or the like.

In some embodiments, playbook engine 508 may be arranged to evaluate heritage playbook sections for relevance using criteria that include event type compatibility, investigation scope alignment, organizational policy requirements, regulatory compliance needs, or the like. In some embodiments, playbook engine 508 may be arranged to maintain heritage playbook profiles that track the effectiveness, relevance, cost-benefit ratios, success rates, or the like for different heritage playbook sections across various investigation scenarios. In some embodiments, playbook engines or analysis engines may be arranged to track the effectiveness of particular portions (or sections) of heritage playbooks. For example, for some embodiments, if a heritage playbook includes a checklist of actions, performance metrics may be evaluated for individual checklist items. Accordingly, in some embodiments, playbook engines may be arranged to determine relevant heritage playbooks or heritage playbook sections based on some or all of the metrics included in corresponding heritage playbook profiles.

Thus, in some embodiments, analysis playbook 506 may evolve from an initial template-based investigation framework into a comprehensive investigation plan that combines automated analysis capabilities with organizational heritage knowledge, procedural requirements, compliance obligations, or the like to ensure thorough or effective security investigations.

Figure 6:
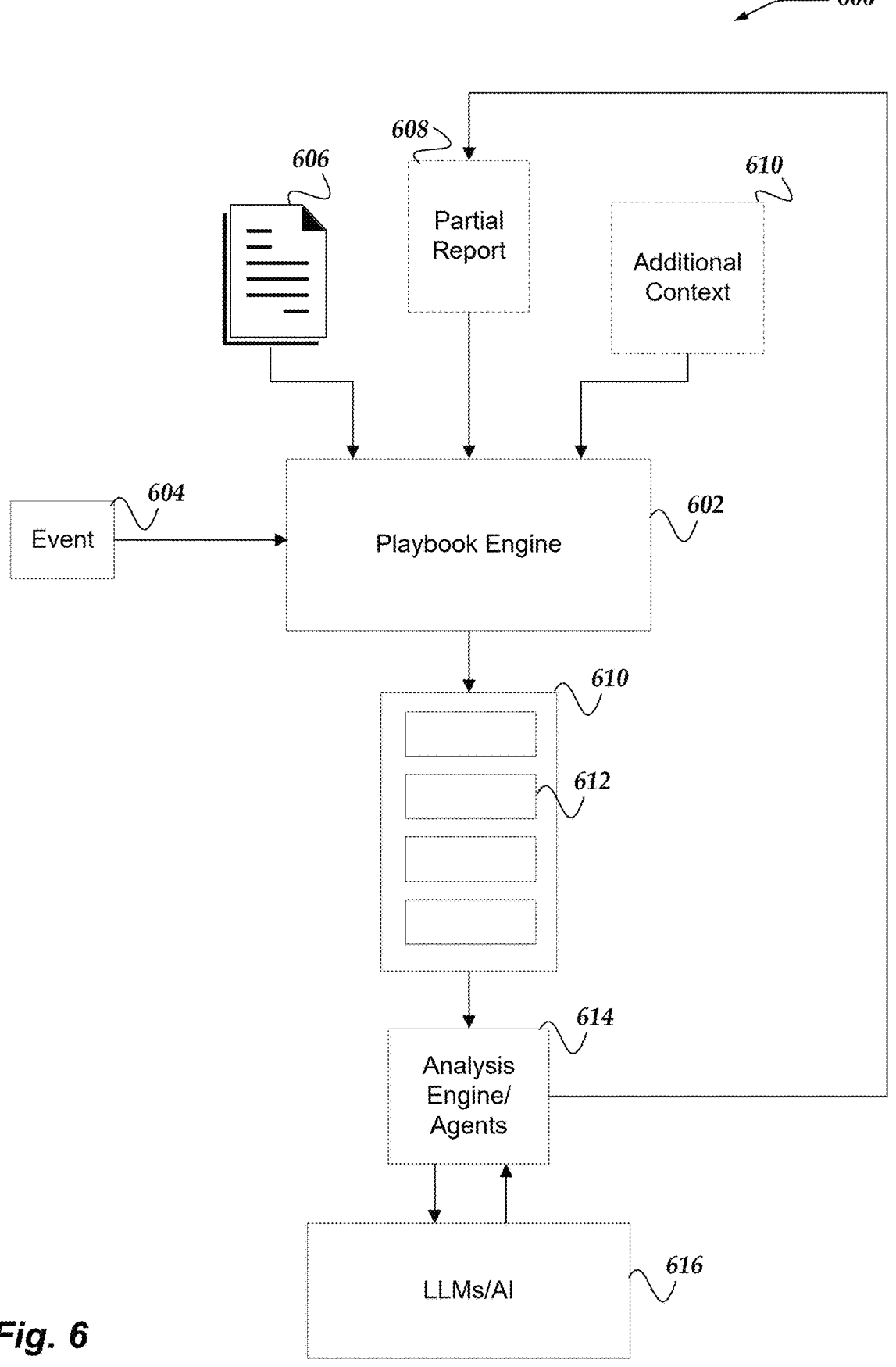
FIG. 6 illustrates a logical schematic of a system for dynamic playbooks for security investigations in accordance with one or more of the various embodiments.

FIG. 6 illustrates a logical schematic of system 600 for dynamic playbooks for security investigations in accordance with one or more of the various embodiments. For some embodiments, system 600 may be considered to represent how playbook engines may iteratively generate generative AI prompts that may be incorporated into analysis playbooks for conducting dynamic security investigations.

In some embodiments, playbook engine 602 may be arranged to generate prompts for generative AI systems based on one or more inputs including heritage playbooks, partial investigation reports, additional context information, or the like. In some embodiments, playbook engine 602 may be arranged to analyze event 604 to determine which heritage playbooks or heritage playbook sections may be relevant to the pending investigation. Accordingly, in some embodiments, playbook engine 602 may be arranged to incorporate information from heritage playbook 606 into prompts that may be used by analysis engines for conducting event analysis or event investigation.

In some embodiments, event 604 may represent security events, incidents, alerts, threat indicators, or the like that may require investigation or analysis. In some embodiments, event 604 may include event information, metadata attributes, source identifiers, temporal information, entity associations, or the like that playbook engine 602 may employ to determine relevant heritage playbooks or additional context information.

In some embodiments, heritage playbook 606 may represent pre-existing organizational playbooks, legacy investigation procedures, compliance requirements, manual response protocols, or the like that organizations may have developed separately or prior to deploying automated investigation systems. Accordingly, in some embodiments, playbook engine 602 may be arranged to analyze heritage playbook 606 using pattern matching algorithms, natural language processing, similarity scoring, machine learning classifiers, generative AI, or the like to identify heritage playbook sections that may be applicable based on event types, current investigation findings, entity associations, threat categories, organizational policies, or the like.

In some embodiments, partial investigation report 608 may represent data structures that include partial investigation results, preliminary findings, event classifications, discovered entities, threat assessments, or the like generated during ongoing investigations. In this example, for some embodiments, partial investigation report 608 is represented using dashed lines because the partial investigation report may not be available in all investigation scenarios or during initial investigation phases. Accordingly, in some embodiments, playbook engine 602 may be arranged to incorporate some or all of the information included in partial investigation report 608 into prompt 610 to provide investigative context for generative AI systems.

In some embodiments, additional context 610 may represent data structures that include supplemental information, environmental data, threat intelligence, organizational policies, regulatory requirements, or the like that may be considered for inclusion in prompt 610. In some embodiments, the particular additional context information may vary depending on various factors including event type, investigation goals, organizational requirements, compliance obligations, threat categories, or the like. Accordingly, in some embodiments, some or all of the particular additional context information may be determined based on the information currently included in partial investigation report 608, heritage playbook 606, the pending analysis playbook, or the like. In some embodiments, analysis playbooks or heritage playbooks may include express instructions to include particular additional context information based on investigation requirements, organizational policies, regulatory compliance needs, or the like.

In some embodiments, prompt 610 may represent a generative AI prompt that may be generated by playbook engine 602 based on the available inputs including event 604, heritage playbook 606, partial investigation report 608, additional context 610, or the like. In some embodiments, initial prompts or prompt templates may be selected based on the event type, investigation type, threat category, organizational requirements, or the like. Accordingly, in some embodiments, playbook engine 602 may be arranged to customize or enhance prompt templates by incorporating specific information from the available inputs to create targeted investigation prompts.

In some embodiments, prompt 610 may include one or more prompt sections, such as prompt section 612, that may represent distinct portions of the generated prompt. In some embodiments, prompt section 612 may include information from heritage playbook 606, partial investigation report 608, additional context 610, pre-prompt information, investigation guidelines, analysis frameworks, or the like. Accordingly, in some embodiments, each prompt section may be directed to particular aspects of the investigation including evidence collection strategies, analysis methodologies, evaluation criteria, reporting requirements, or the like. Thus, in some embodiments, the modular structure of prompt 610 may enable playbook engine 602 to dynamically assemble specialized investigation prompts that combine automated analysis capabilities with organizational heritage knowledge, procedural requirements, or compliance obligations to ensure thorough security investigations.

In some embodiments, playbook engines may be arranged to provide prompt 610 or the like to an analysis engine or one or more agents, such as analysis engine/agents 614 that may employ it as part of an investigation of event 604. In some embodiments, analysis engines may be arranged to request that playbook engines provide updated prompts based on information learned from partial or incomplete investigations. In some embodiments, analysis engines may be arranged to conduct a complete investigation that may be augmented or updated based on incorporating investigative or analysis actions from included from heritage playbooks. Accordingly, in this example, for some embodiments, the line connecting analysis engine/agents 604 to partial report 608 represents iterative or progressive progress of the investigation.

Also, as described herein, analysis engines or agents may be arranged to use one or more generative AI systems to evaluate or interpret prompts, such as prompt 610 as part of investigations. Note, in some embodiments, analysis engines or agents may be configured to execute conventional analysis, such as NLP, pattern matching, heuristics, machine learning classifiers, or the like as part of an investigation rather than being limited to using generative AI or large language models. For example, in some cases, analysis playbooks may include sections that include declarative or imperative instructions for performing an investigation. For example, for some embodiments, such sections may include instructions for validating various facts, such as network address, email addresses, addresses, user credentials, user identification, user roles, or the like that may be associated with an event being investigated.

Figure 7:
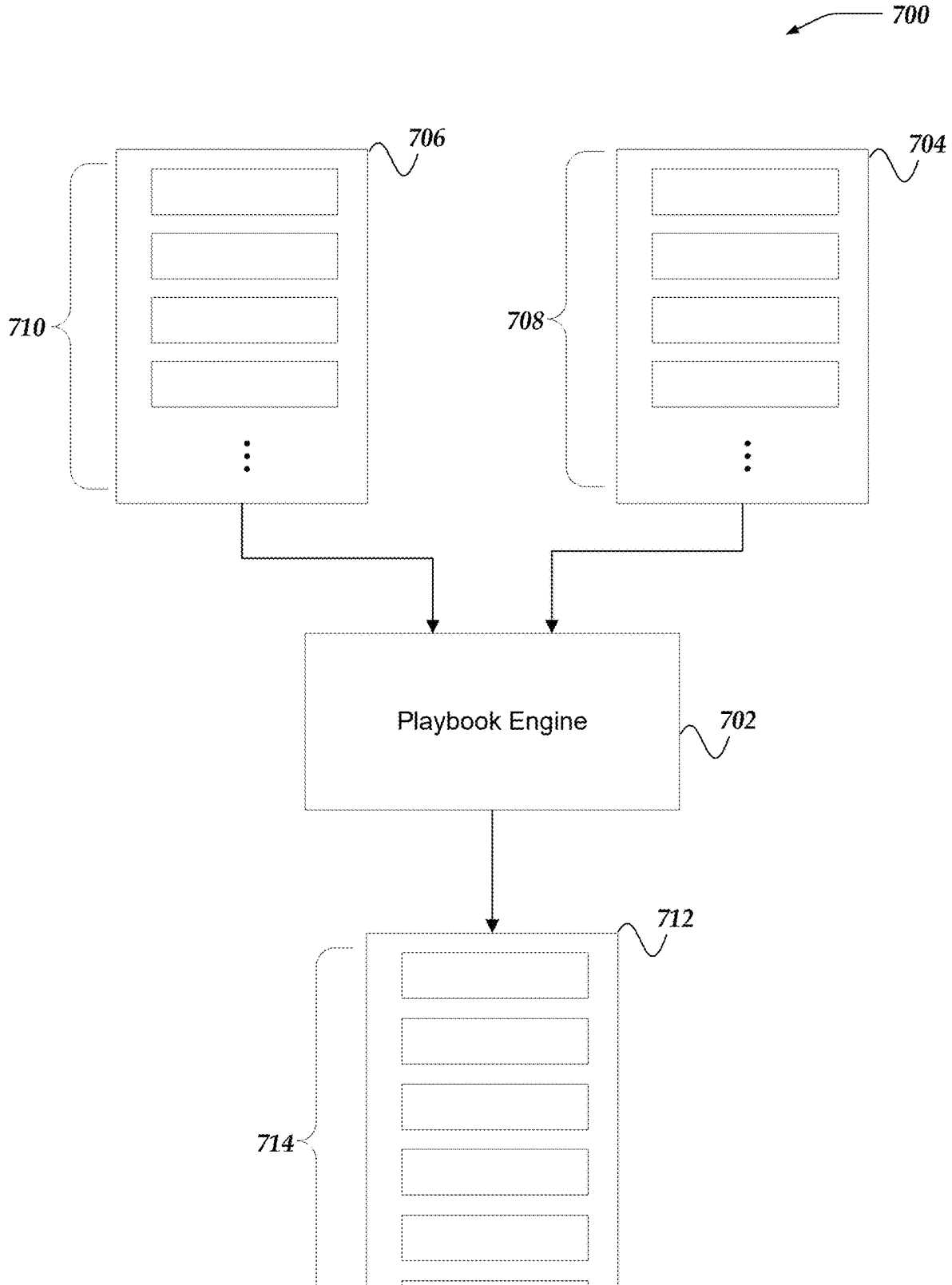
FIG. 7 illustrates a logical schematic for a system for dynamic playbooks for security investigations in accordance with one or more of the various embodiments.

FIG. 7 illustrates a logical schematic of system 700 for dynamic playbooks for security investigations in accordance with one or more of the various embodiments. In some embodiments, system 700 may be considered to represent how playbook engines may systematically evaluate, select, or incorporate heritage playbook sections into analysis playbooks to create investigation frameworks that combine automated analysis capabilities with organizational heritage knowledge.

In some embodiments, playbook engine 702 may be arranged to obtain analysis playbook 704, which may represent an initial or partial investigation framework that includes one or more analysis playbook sections 708. In some embodiments, analysis playbook sections 708 may represent discrete investigation directives including queries directed to evaluation services, heuristic analysis instructions, metric collection procedures, automated analysis actions, threat assessment criteria, or the like. For example, in some embodiments, analysis playbook sections 708 may include directives such as "query external threat intelligence service for IP reputation," "execute network traffic analysis heuristics," "collect endpoint memory utilization metrics," "evaluate user authentication patterns," or the like. Accordingly, in some embodiments, analysis playbook 704 may provide a foundation investigation structure that playbook engine 702 may systematically enhance by incorporating relevant organizational procedures or compliance requirements from heritage sources.

In some embodiments, playbook engine 702 may be arranged to evaluate heritage playbook 706, which may include one or more heritage playbook sections 710 that represent discrete organizational procedures, compliance requirements, manual investigation steps, legacy response protocols, checklist items, regulatory obligations, or the like. In some embodiments, heritage playbook sections 710 may be derived from pre-existing organizational documentation including incident response procedures, security checklists, compliance frameworks, manual investigation guides, operational runbooks, or the like that organizations may have developed prior to deploying automated investigation systems. For example, in some embodiments, heritage playbook sections 710 may include procedural requirements such as "notify CISO within 30 minutes of malware detection," "verify user travel schedule against suspicious login locations," "check Active Directory group membership for affected accounts," "review calendar events for users involved in incident," "validate backup integrity for compromised systems," or the like. In some embodiments, heritage playbook sections 710 may also include compliance-driven requirements such as "generate audit trail documentation for SOX compliance," "preserve evidence chain-of-custody records," "notify legal department for potential litigation holds," or the like.

In some embodiments, playbook engine 702 may be arranged to analyze both analysis playbook sections 708 or heritage playbook sections 710 to identify potential integration opportunities, redundant procedures, complementary actions, conflicting requirements, or overlapping investigation steps. Accordingly, in some embodiments, playbook engine 702 may employ various evaluation mechanisms including natural language processing algorithms, similarity analysis techniques, pattern matching methods, semantic comparison tools, machine learning classifiers, generative AI systems, or the like to assess the relevance, compatibility, or value of heritage playbook sections 710 for inclusion in the pending investigation. For example, in some embodiments, if analysis playbook sections 708 include "analyze user login patterns" or heritage playbook sections 710 include "review user authentication history," playbook engine 702 may determine these sections address similar investigation objectives or may be consolidated into a unified analysis directive.

In some embodiments, playbook engine 702 may be arranged to implement deduplication processes to identify redundant investigation actions between analysis playbook sections 708 or heritage playbook sections 710. In some embodiments, deduplication may include comparing investigation objectives, evaluation targets, data collection requirements, analysis methodologies, reporting criteria, or other procedural elements to eliminate duplicate efforts. For example, in some embodiments, if analysis playbook sections 708 include "collect network traffic metadata from firewall logs" or heritage playbook sections 710 include "review firewall logs for suspicious connections," playbook engine 702 may identify these as redundant data collection activities or consolidate them into a single comprehensive network analysis directive. Accordingly, in some embodiments, playbook engine 702 may be configured to suppress redundant heritage playbook sections that duplicate existing analysis playbook capabilities or consolidate similar procedures into unified investigation directives.

In some embodiments, playbook engine 702 may be arranged to maintain heritage playbook metrics including importance scores, success ratings, utilization frequencies, user feedback scores, effectiveness measurements, cost-benefit ratios, investigation contribution values, or the like for individual heritage playbook sections 710. In some embodiments, these metrics may be employed to prioritize heritage playbook sections for inclusion based on historical performance, organizational value, investigation relevance, compliance requirements, or user preferences. For example, in some embodiments, if heritage playbook sections 710 include "check user's manager approval status" with high importance scores or frequent utilization in previous investigations, playbook engine 702 may prioritize this section for inclusion in augmented analysis playbook 712. Accordingly, in some embodiments, playbook engine 702 may be configured to dynamically weight heritage playbook selection criteria based on accumulated performance data, user feedback patterns, or investigation outcome correlations.

In some embodiments, playbook engine 702 may be arranged to evaluate heritage playbook sections 710 for organizational context relevance, including matching event types with procedural requirements, aligning investigation scope with heritage instructions, validating resource availability for heritage procedures, or assessing compliance obligations triggered by specific incident categories. For example, in some embodiments, if the current investigation involves endpoint malware detection, playbook engine 702 may select heritage playbook sections 710 that include "isolate affected endpoint from network," "image hard drive for forensic analysis," "notify incident response team," or the like while excluding heritage sections related to network infrastructure incidents.

In some embodiments, playbook engine 702 may be arranged to perform cost-benefit analysis for heritage playbook sections 710 based on execution time requirements, resource consumption patterns, information gathering effectiveness, investigation delay impacts, or organizational value contributions. For example, in some embodiments, if heritage playbook sections 710 include "manually review user email for 30 days prior to incident" with low effectiveness scores or high time consumption metrics, playbook engine 702 may exclude this section from augmented analysis playbook 712 unless organizational policies mandate its inclusion for compliance purposes.

In some embodiments, playbook engine 702 may be arranged to generate augmented analysis playbook 712 by systematically incorporating selected heritage playbook sections into the investigation framework. In some embodiments, augmented analysis playbook 712 may include both original analysis playbook sections 708 or selected heritage playbook sections that have been determined to be relevant, non-redundant, or valuable for the pending investigation. Accordingly, in some embodiments, the augmentation process may include translating natural language heritage procedures into machine-readable investigation directives, mapping heritage requirements to automated analysis actions, generating agent prompts based on heritage procedures, or adapting legacy instructions for integration with automated investigation workflows. For example, in some embodiments, if heritage playbook sections 710 include natural language instruction "verify if user was traveling during suspicious login," playbook engine 702 may translate this into machine-readable directive "query calendar system for user travel events within incident timeframe" or generate agent prompt "determine user location context for authentication anomaly."

In some embodiments, augmented analysis playbook 712 may include playbook sections 714, which may represent the final collection of investigation directives that combine automated analysis capabilities with relevant organizational heritage procedures. In some embodiments, playbook sections 714 may include original analysis directives, translated heritage procedures, compliance requirements, regulatory obligations, organizational policies, user-specified instructions, or the like that collectively define a comprehensive investigation approach. Accordingly, in some embodiments, playbook sections 714 may represent a unified investigation plan that ensures both technical analysis effectiveness or organizational procedural compliance.

In some embodiments, playbook engine 702 may be arranged to support iterative playbook enhancement throughout the investigation lifecycle such that emerging investigation findings, newly discovered evidence, changing threat assessments, or supplemental user input may trigger additional heritage playbook evaluations or playbook section selections. For example, in some embodiments, if initial investigation results indicate potential insider threat activity, playbook engine 702 may dynamically incorporate additional heritage playbook sections 710 related to human resources procedures, background verification requirements, management notification protocols, or the like into augmented analysis playbook 712. Thus, in some embodiments, during investigation execution, analysis engines may resubmit partial investigation results to playbook engine 702 to determine if emerging findings indicate that additional heritage playbook sections should be incorporated into augmented analysis playbook 712 for the ongoing investigation.

Thus, in some embodiments, system 700 may enable organizations to leverage existing procedural knowledge while benefiting from automated investigation capabilities, ensuring that critical organizational requirements, compliance obligations, or heritage procedures are preserved or integrated into security investigation workflows.

Figure 8:
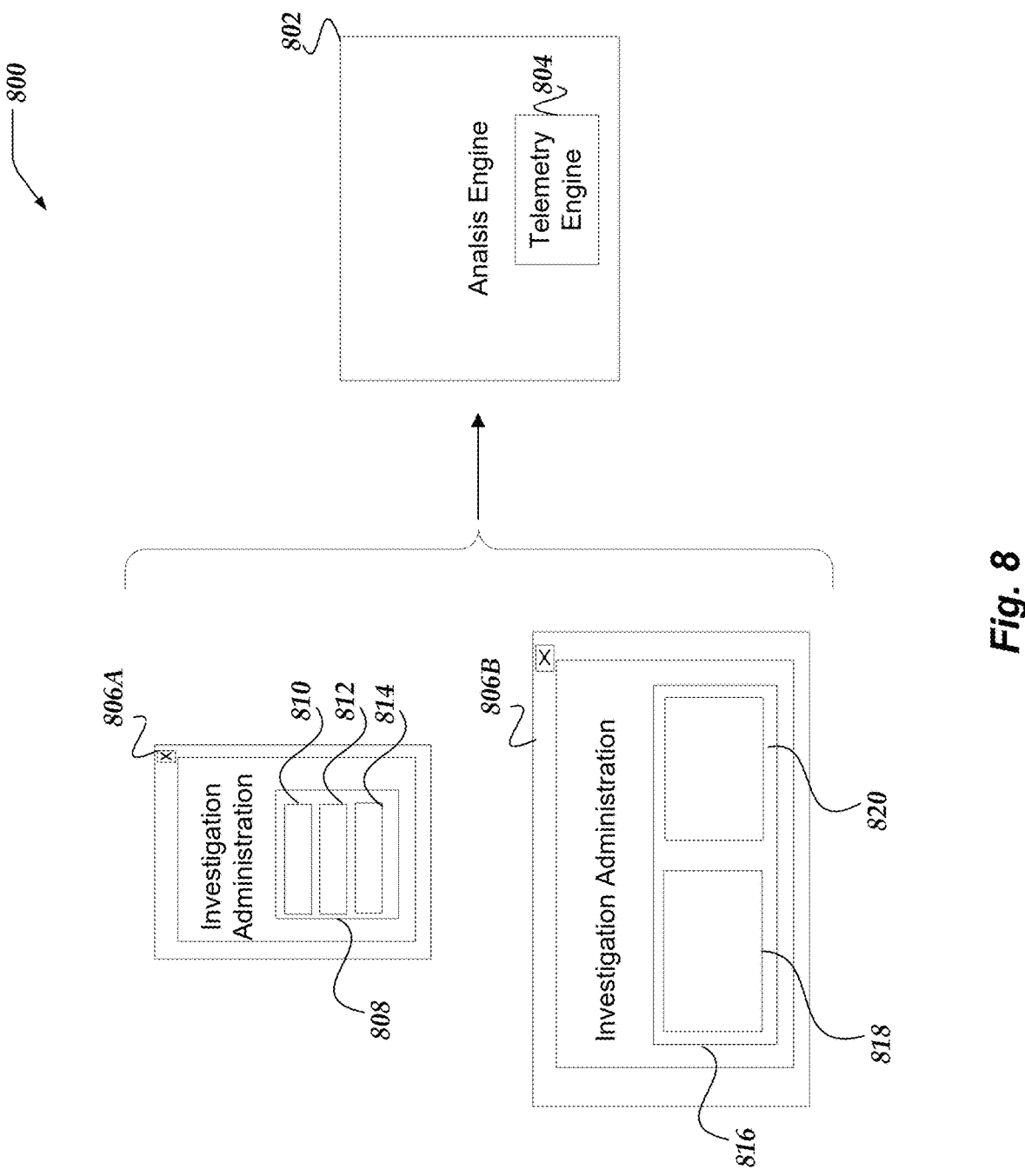
FIG. 8 illustrates a logical schematic for a system for collecting and applying telemetry information and telemetry metrics for dynamic playbooks for security investigations in accordance with one or more of the various embodiments.

FIG. 8 illustrates a logical schematic of system 800 for collecting and applying telemetry information and telemetry metrics for dynamic playbooks for security investigations in accordance with one or more of the various embodiments. System 800 may comprise various constituents, including: analysis engine 802; telemetry engine 804; one or more client user interfaces, such as user interface 806 (A or B); or the like.

In some embodiments, analysis engines or playbook engines (not shown), such as analysis engine 802 may be arranged to perform one or more actions to support the operation, organization, management, or execution of dynamic playbooks for security investigations.

Further, in some embodiments, systems, such as system 800 may include one or more telemetry engines, such as telemetry engine 804. In some embodiments, telemetry engines may be arranged to monitor or evaluate interactions with applications or user interfaces such as user interface 806A, user interface 806B, or the like. In some embodiments, this may include monitoring how users or even other applications may interact with user interfaces, interactive reports, various applications, or one or more system features. Accordingly, in some embodiments, one or more telemetry metrics or user interaction metrics may be employed to adapt or rearranged user interfaces or the like in view of the telemetry metrics or user interaction metrics. Note, in this example, for some embodiments, user interface 806A may represent the presentation or display of a user interface in a first adapted arrangement while user interface 806B may represent the present of display of the same user interface having a second adapted arrangement. For example, for some embodiments, user interface 806A may be the user interface displayed in portrait mode while the user interface 806B may be considered to be the user interface in landscape mode after a hardware display has been rotated.

In some embodiments, user interfaces, such as user interface 806A or user interface 806B may include various windows, controls, or other user interface features. In some embodiments, user interfaces may include various user interface panels, such as panel 808, panel 816, or the like. For example, in some embodiments, panel 808, or the like may represent a user interface that enables users, such as security analysts, to review investigation playbook information or perform investigation playbook administration displayed in a portrait (vertical) orientation while user interface 806B may represent dynamic playbook investigation information displayed in a landscape (horizontal) orientation. Further, in some embodiments, element 810, element 812, element 814, element 818, element 820, or the like may be considered to represent various user interface elements, controls, buttons, list items, report features, user interface components, displayed content, formatted content, or the like that may be included in user interfaces.

Also, for example, for some embodiments, user interface 806A or 806B may be considered a user interface that enables administrative users to work with investigation playbooks, including heritage playbooks, analysis playbooks, or the like. For example, panel 808 may be used to select, generate, or modify analysis playbooks, heritage playbooks, investigation queries, provide supplemental evidence, or the like. For example, display panel 808 may be used to display quality or effectiveness rankings for one or more analysis playbooks, heritage playbooks, heritage playbooks sections, or the like ordered based on inferred importance, value, or the like. Likewise, in some embodiments, panels such as panel 808 may be used to display heritage playbook repository schema information, playbook sections, candidate playbook sections, display reports regarding playbook section records and their relevance to pending or previous incident investigations or security investigations, or the like.

In some embodiments, analysis engines, such as analysis engines 802 (as well as telemetry engines, playbook engines, or the like) may be arranged to generate or display user interfaces, such as user interface 806A or user interface 806B to users using one or more of video interface 242, projector 246, display 250, or the like, of a client computer, such as client computer 200. Similarly, in some embodiments, analysis engine 402, playbook engine 430, or ingestion engine 404 may be arranged to generate or display user interface 432, user interface 436, or the like to users using a one or more of input/output interface 338, display 350, audio interface 356, or the like, of a network computer, such as network computer 300.

In some embodiments, analysis engines, such as analysis engine 802 (as well as telemetry engines, playbook engines, or the like) may be arranged to collect various telemetry or other metrics associated with user interactions with user interfaces. In some embodiments, telemetry may include tracking or monitoring if users may be in agreement with the generated analysis playbooks, heritage playbook section selection/execution, report arrangement/organization, or the like. In some embodiments, analysis engines, or the like may be enabled to employ telemetry information or telemetry metrics collected or determined by telemetry engines, such as telemetry engine 804. In some embodiments, telemetry engines may be separate from analysis engines, playbook engines, ingestion engines, or the like as shown in FIG. 4. Also, in some embodiments, telemetry engines may be part of or otherwise embedded in analysis engines, playbook engines, ingestion engines, or the like.

Also, in one or more embodiments, various types of collected user telemetry may include a user's selection or non-selection of one or more particular elements or content in a display panel, pointing device (mouse) hover time over particular content or elements in a display panel, user dwell time between actions in a display panel, dwell time for viewing a display panel by a user, and the like.

In one or more of the various embodiments, analysis engines, playbook engines, ingestion) engines, or the like may be arranged to monitor telemetry information associated with one or more users.

Accordingly, in some embodiments, analysis engines, playbook engines, ingestion engines, or the like may be arranged to provide one or more user interface facilities to collect direct feedback from one or more of the users that may interact with information displayed in the one or more user interfaces. For example, in some embodiments, user interfaces may include controls that enable authorized users to grade one or more investigation reports, candidate playbooks, candidate playbook sections, playbook profiles, or the like.

In some embodiments, grades or scores may be binary (e.g., like/dislike), discrete (e.g., one-four stars, letter grades), continuous values, or the like.

Also, in one or more of the various embodiments, analysis engines, playbook engines, ingestion engines, or the like may be arranged to provide user interfaces that monitor how users interact with input information, events, investigation reports, recommended resolution actions, or the like. In some embodiments, telemetry information employed to monitor user preferences may be based on monitoring user interactions as well as direct feedback. Accordingly, in some embodiments, input information, playbooks, candidate playbook sections, or the like, that may appear well-formed but are ignored or discarded by users may be inferred to be poorly received. For example, for some embodiments, if the top ranked results provided in response to user actions, user queries, or the like, are ignored or lower ranked results are favored by users, it may be inferred that there may be a problem with the data or the display of the data.

Further, in some embodiments, analysis engines, or the like may be arranged to receive telemetry information from other services or applications. Accordingly, in one or more of the various embodiments, playbook engines, or the like may not be required to directly monitor activity associated with the input information, candidate playbook sections, analysis playbooks, heritage playbooks, investigation reports, recommend resolution actions, or the like. For example, for some embodiments, user interfaces, such as user interface 806A or user interface 806B may be displayed to users via desktop computer applications, mobile applications, web-based applications, or the like.

In some embodiments, such applications may collect the telemetry information and provide some or all it to analysis engines, playbook engines, ingestion engines, or the like rather than requiring the analysis engines, playbook engines, ingestion engines, or the like to include monitoring facilities on user-facing applications.

Accordingly, in some embodiments, analysis engine 802, or the like may be arranged to collect metrics or telemetry associated with user interactions with user interface 806A or user interface 806B using a one or more of input/output interface 238, cameras 240, touch interface 244, keypad 252, audio interface 256, GPS, 258, open air gesture interface 260, haptic interface 264, pointing device interface 266, or the like, of a client computer, such as client computer 200. Similarly, in some embodiments, analysis engine 802, or the like may be arranged to collect metrics or telemetry associated with user interactions with user interface 806A, user interface 806B using a one or more of input/output interface 338, GPS 340, keyboard 352, audio interface 356, pointing device interface 358, or the like, of a network computer, such as network computer 300.

In some embodiments, analysis engines, playbook engines, or the like may be arranged to track mouse movement, eye movement, keystrokes, or the like, to determine how users may interact with information (e.g., input information, events, investigation reports, candidate playbook sections, playbook sections, recommended resolution actions, or the like) displayed in user interfaces. Accordingly, in some embodiments, analysis engines, playbook engines, or the like may be arranged to evaluate at least the quality of various investigation recommendations, playbook section selection, report characteristics, or the like based on how users interact with them via the user interfaces. For example, if users consistently select or otherwise favor interacting with items or candidate playbook sections ranked lower than others, it may indicate that one or more models performing the ranking or item selection may be experiencing diminished or diminishing effectiveness. Likewise, in some embodiments, users may reject or ignore report results, suggested actions, playbook section suggestions, investigation conclusions, or the like which may indicate that one or more associated models or systems may be experiencing diminished or diminishing effectiveness.

In some embodiments, analysis engines, playbook engines, or the like may be arranged to associate a performance score with user interfaces used in the system based on the user interaction metrics or telemetry. Accordingly, in some embodiments, if the performance score associated with a user interface or user interface element falls below a defined threshold value, playbook engines, or the like may be arranged to suspend those user interfaces (or portions thereof) from operation. Or, in some embodiments, analysis engines, playbook engines, or the like may be arranged to automatically modify the deficient user interfaces.

Also, in some embodiments, telemetry engines may be arranged to collect or determine telemetry information that includes user telemetry, user feedback, or telemetry metrics that may be used to dynamically transform user interfaces, display panels, and the like. The dynamic transformation may include arrangement, re-arrangement, elimination, addition, or adaptation of content and visual elements in user interfaces and display panels based on at least the collected telemetry information.

Additionally, in some embodiments, telemetry engines may collect metrics associated with the one or more user interactions with the system including content within the user interfaces and display panels. In some embodiments, user profiles may be configured to dynamically include user interface preferences based on collected user telemetry metrics and user feedback. Accordingly, in some embodiments, analysis engines, playbook engines, ingestion engines, or the like may dynamically change the visual appearance of the user interfaces to improve the efficiency and effectiveness of the system or its user interfaces for the user. Accordingly, in some embodiments, analysis engines, playbook engines, or ingestion engines may be arranged to dynamically select, position, size, shape, remove, hide, inactivate, disable, highlight, or style one or more visual user interface components such as display panels, controls, elements and content based on one or more of user telemetry metrics and user feedback. For example, if user interactions with the user interface are tracked focusing on or navigating to particular user interface views, components or user interface panels, system components, such as analysis engines, playbook engines, or ingestion engines may be arranged to dynamically highlight or size the preferred user interface elements and/or display panels. For example, if users are determined to rarely interact with a user interface element, such as element 814, analysis engines, playbook engines, or the like may be arranged to dynamically reduce the size, diminish the shape, disable its controls, or re-position element 814 by displaying a smaller sized greyed out version of element 814 in its display panel.

Also, in some embodiments, analysis engines, playbook engines, or the like may be arranged to adapt user interfaces based on the size/type of display, input methods, user status, or the like. For example, in some embodiments, if a user is determined to be operating using a mobile device, one or more user interface elements may be dynamically positioned differently. In some cases, for some embodiments, depending on the display type or display size, one or more user interface elements may be hidden from view. For example, for some embodiments, a analysis engines or playbook engine may be arranged to dynamically modify or re-arrange user interface 806A to obtain user interface 806B based on telemetry associated with the display or associated user interactions. Accordingly, in this example, display panel 816 may be considered to be dynamically modified or rearranged to accommodate the modified physical orientation of the display. Further, in this example, user interface 806 now may be considered to display two elements (element 818 and element 820) rather than three elements as were displayed in user interface 806A. Thus, in this example, analysis engine 802 may display two elements for the landscape (horizontal) orientation instead of the three elements displayed in the portrait (vertical) orientation based on one or more telemetry metrics.

Accordingly, in some embodiments, analysis engines, playbook engines, or the like may be arranged to tangibly modify user interfaces, display panels, interactive reports, input collection, input selection, input data representation, playbook sections, investigation playbooks, heritage playbooks, or the like, based on the efficient and effective performance of processes and/or activities associated with various types input information, events, playbook sections, investigation playbooks, investigation results, or the like as determined by telemetry information, or the like.

Generalized Operations

FIGS. 9-12 represent generalized operations for dynamic investigation playbooks in accordance with one or more of the various embodiments. In one or more of the various embodiments, processes 900, 1000, 1100, and 1200 described in conjunction with FIGS. 9-12 be implemented by or executed by one or more processors on a single network computer such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based or containerized environments. However, embodiments are not so limited and various combinations of network computers, client computers, or the like may be utilized. Further, in one or more of the various embodiments, the processes described in conjunction with FIGS. 9-12 may be used for dynamic investigation playbooks in accordance with at least one of the various embodiments or architectures such as those described in conjunction with FIGS. 1-8. Further, in one or more of the various embodiments, some or all of the actions performed by processes 900, 1000, 1100, and 1200 may be executed in part by analysis engine 322, playbook engine 324, ingestion engine 326, agents 327, telemetry engine 328, or the like, running on one or more processors of one or more network computers.

Figure 9:
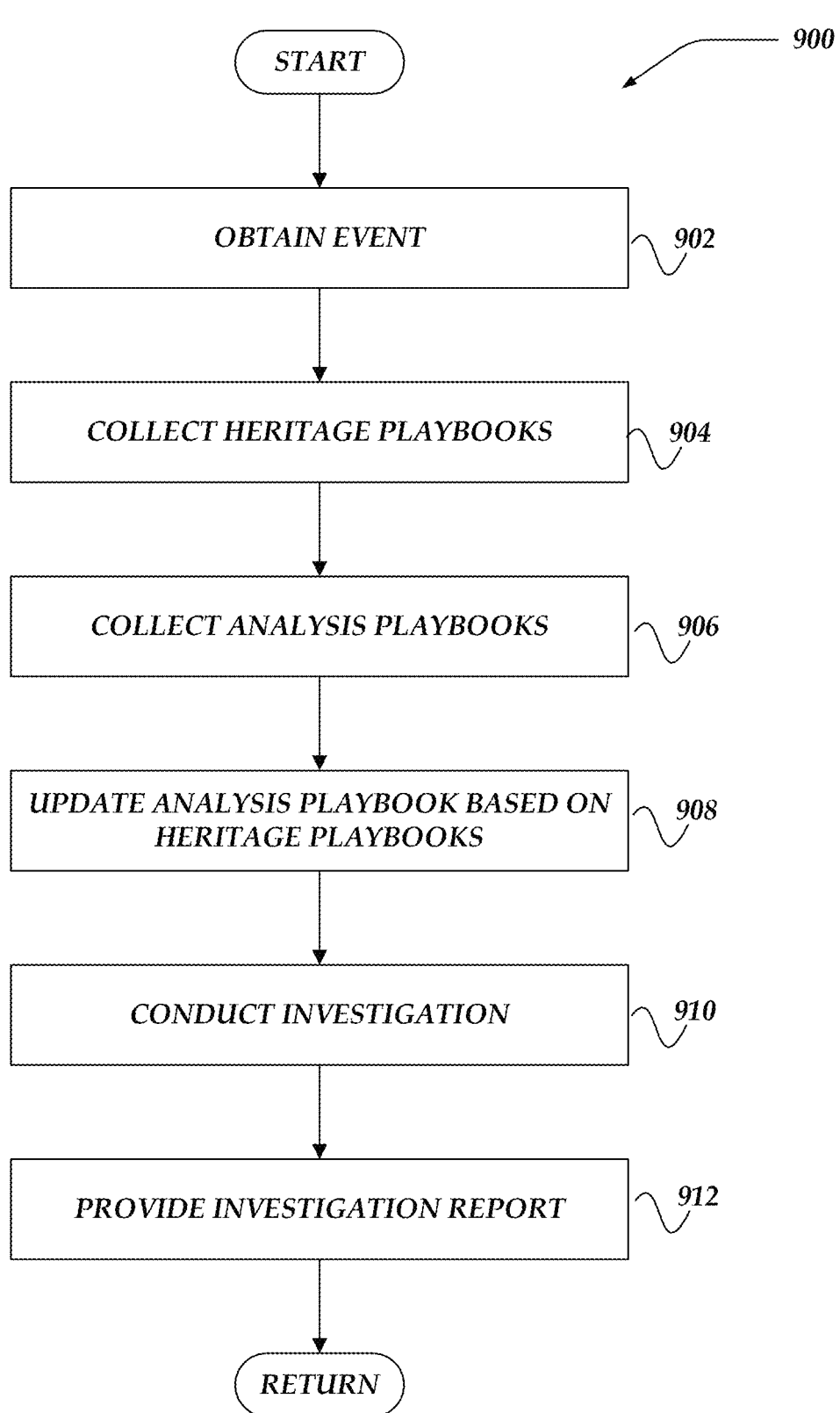
FIG. 9 illustrates an overview flowchart of a process for dynamic playbooks for security investigations in accordance with one or more of the various embodiments.

FIG. 9 illustrates an overview flowchart of process 900 for dynamic playbooks for security investigations in accordance with one or more of the various embodiments. After a start block, at block 902, in one or more of the various embodiments, ingestion engines may be arranged to obtain one or more events or event information that may be associated with a potential incident. In some embodiments, ingestion engines may be arranged to collect events or event information from various sources including security information and event management systems, network monitoring tools, endpoint detection systems, application log files, or the like. In some embodiments, event information may include alert notifications, security indicators, anomalous activity reports, system health warnings, compliance violations, or the like that may indicate potential security incidents that may require investigation. Accordingly, in some embodiments, ingestion engines may be configured to normalize event data formats, validate event integrity, enrich events with contextual metadata, correlated related events, or establish event priority levels based on organizational security policies or threat assessment criteria. In some embodiments, ingestion engines may be arranged to apply initial event filtering, deduplication processes, or classification algorithms to prepare events for subsequent analysis by playbook engines or analysis engines.

At block 904, in one or more of the various embodiments, playbook engines may be arranged to collect one or more heritage playbooks based on the event information. In some embodiments, playbook engines may be arranged to identify relevant heritage playbooks by analyzing event characteristics including event types, affected systems, associated users, threat categories, organizational departments, compliance requirements, or the like. In some embodiments, heritage playbooks may include pre-existing organizational procedures, legacy investigation checklists, compliance frameworks, manual response protocols, regulatory requirements, industry best practices, or the like that organizations may have developed prior to deploying automated investigation systems. Accordingly, in some embodiments, playbook engines may be configured to employ pattern matching algorithms, natural language processing techniques, similarity scoring mechanisms, machine learning classifiers, or generative AI systems to determine which heritage playbooks or heritage playbook sections may be applicable to the current event investigation. Also, in some embodiments, playbook engines may be arranged to evaluate heritage playbook relevance based on historical effectiveness metrics, organizational priority rankings, compliance mandates, or user feedback scores associated with previous investigations.

At block 906, in one or more of the various embodiments, playbook engines may be arranged to collect one or more analysis playbooks. In some embodiments, playbook engines may be arranged to generate initial analysis playbooks based on event classifications, threat intelligence correlations, organizational security policies, investigation templates, or automated analysis frameworks designed for specific event types or threat categories. In some embodiments, analysis playbooks may include machine-readable investigation directives, agent prompts for generative AI systems, evaluation criteria for threat assessment, data collection strategies, analysis methodologies, reporting requirements, or the like that may be used to guide automated security investigations. Accordingly, in some embodiments, playbook engines may be configured to select analysis playbook templates from playbook repositories based on event characteristics, investigation objectives, available resources, regulatory compliance needs, or organizational preferences. In some embodiments, analysis playbooks may include instructions for querying external threat intelligence services, executing behavioral analysis algorithms, collecting additional system metrics, evaluating user authentication activity, or performing network traffic analysis.

At block 908, in one or more of the various embodiments, playbook engines may be arranged to update the one or more analysis playbooks based on the one or more heritage playbooks. In some embodiments, playbook engines may be arranged to incorporate relevant heritage playbook sections into analysis playbooks through systematic evaluation processes that identify complementary procedures, eliminate redundant actions, resolve conflicting requirements, or optimize investigation workflows.

In some embodiments, playbook engines may be configured to translate natural language heritage instructions into machine-readable investigation directives, generate agent prompts based on heritage procedures, map heritage requirements to automated analysis actions, adapt legacy instructions for integration with automated investigation systems, or the like. Accordingly, in some embodiments, playbook engines may be arranged to perform deduplication analysis to identify overlapping investigation steps between heritage playbooks or analysis playbooks, consolidate similar procedures into unified directives, or suppress redundant actions to optimize investigation efficiency. In some embodiments, playbook engines may be arranged to maintain heritage playbook value profiles that track effectiveness metrics, cost-benefit ratios, success rates, or organizational value contributions for different heritage playbook sections across various investigation scenarios. Thus, in some embodiments, updated analysis playbooks may represent comprehensive investigation frameworks that combine automated analysis capabilities with organizational heritage knowledge, procedural requirements, or compliance obligations.

At block 910, in one or more of the various embodiments, analysis engines may be arranged to conduct an investigation of the one or more events based on the updated analysis playbook. In some embodiments, analysis engines may be arranged to execute investigation directives from updated analysis playbooks. In some embodiments, investigation actions may include one or more of automated data collection, threat intelligence queries, behavioral analysis procedures, system metric evaluation, user activity assessment, network traffic analysis, compliance verification tasks, or the like.

In some embodiments, analysis engines may be configured to instantiate one or more management agents or action agents to perform specific investigation tasks, interface with external evaluation services, execute generative AI prompts, apply machine learning classifiers, conduct heuristic analysis based on playbook instructions. or the like. Accordingly, in some embodiments, analysis engines may be arranged to collect evidence from various sources including system logs, network monitoring data, endpoint forensics information, user activity records, threat intelligence platforms, configuration databases, security information repositories, or the like based on investigation requirements specified in the dynamically updated analysis playbooks. In some embodiments, analysis engines may be arranged to apply threat assessment criteria, calculate risk scores, correlate evidence across multiple data sources, identify compromise indicators, evaluate attack patterns, determine incident severity levels, or the like based on analysis frameworks defined in the updated analysis playbooks.

At block 912, in one or more of the various embodiments, analysis engines may be arranged to provide an investigation report regarding the one or more events or the event information. In some embodiments, analysis engines may be arranged to generate interactive investigation reports that may include threat assessments, evidence documentation, risk evaluations, compromise indicators, attack vector analysis, affected system inventories, recommended mitigation actions, compliance status summaries, or the like based on investigation findings.

In some embodiments, investigation reports may be formatted as machine-readable data structures, interactive dashboards, executive summaries, technical analysis documents, compliance audit trails, regulatory filing reports, or the like depending on organizational requirements or local circumstances. Accordingly, in some embodiments, analysis engines may be configured to include heritage playbook execution results, procedural compliance verification, organizational requirement fulfillment, regulatory obligation satisfaction, policy adherence confirmation, or the like in investigation reports to demonstrate the scope or depth of investigation coverage. Also, in some embodiments, investigation reports may include performance metrics for heritage playbook sections, effectiveness assessments for analysis procedures, cost-benefit analysis for investigation actions, recommendations for playbook optimization, or the like based on investigation outcomes.

Thus, in some embodiments, investigation reports may provide detailed documentation of automated investigation processes while preserving organizational procedural knowledge or ensuring compliance with established security response protocols.

Next, in one or more of the various embodiments, control may be returned to a calling process.

Figure 10:
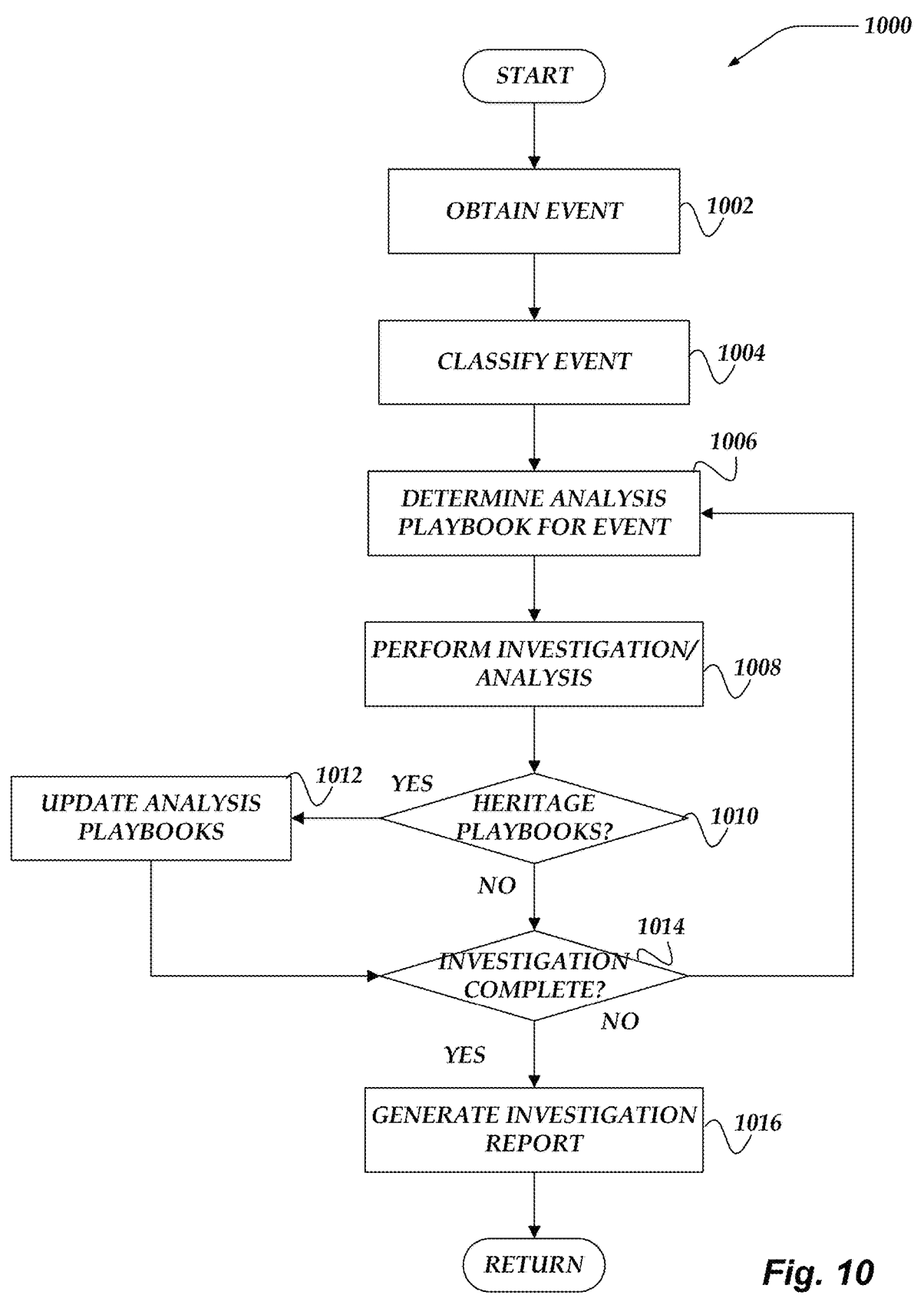
FIG. 10 illustrates a flowchart of a process for dynamic playbooks for security investigations in accordance with one or more of the various embodiments.

FIG. 10 illustrates a flowchart of process 1000 for dynamic playbooks for security investigations in accordance with one or more of the various embodiments. After a start block, at block 1002, in one or more of the various embodiments, playbook engines may be arranged to obtain an event or event information.

In some embodiments, playbook engines may be arranged to receive events or event information from ingestion engines that have collected security alerts, incident notifications, anomalous activity reports, system health warnings, or compliance violations from various monitoring sources. In some embodiments, event information may include structured data containing event metadata, source identifiers, severity levels, affected systems, associated users, threat categories, timestamps, contextual attributes, or the like that may characterize potential security incidents. Accordingly, in some embodiments, playbook engines may be configured to validate event data integrity, normalize event formats, extract relevant identifiers, classify initial event types, establish investigation priority levels, or the like based on organizational security policies or threat assessment frameworks.

At block 1004, in one or more of the various embodiments, playbook engines may be arranged to classify the event. In some embodiments, playbook engines may be arranged to analyze event characteristics using pattern matching algorithms, machine learning classifiers, natural language processing techniques, threat intelligence correlations, generative AI systems, or the like to determine event categories, threat types, attack surfaces, compliance implications, or organizational impact levels. In some embodiments, event classification may include evaluating MITRE ATT&CK framework mappings, determining affected infrastructure components, identifying associated user roles, assessing regulatory compliance requirements, establishing investigation complexity levels, or the like. Accordingly, in some embodiments, playbook engines may be configured to generate event classification metadata that includes threat categorizations, environmental context, entity associations, compliance obligations, investigation scope parameters, or the like that may guide subsequent analysis playbook selection or heritage playbook identification processes.

At block 1006, in one or more of the various embodiments, playbook engines may be arranged to determine an analysis playbook for investigating the event. In some embodiments, playbook engines may be arranged to select initial analysis playbooks from playbook repositories based on event classifications, threat intelligence correlations, organizational security policies, investigation templates, automated analysis frameworks, or the like that may be directed to particular event types or threat categories. In some embodiments, analysis playbooks may include machine-readable investigation directives, agent prompts for generative AI systems, evaluation criteria for threat assessment, data collection strategies, analysis methodologies, reporting requirements, escalation procedures, or the like that may guide automated security investigations. Accordingly, in some embodiments, playbook engines may be configured to customize analysis playbooks based on available resources, regulatory compliance needs, organizational preferences, investigation objectives, environmental constraints to establish comprehensive investigation frameworks, or the like.

At block 1008, in one or more of the various embodiments, playbook engines may be arranged to provide the analysis playbooks to analysis engines to conduct the investigation of the event. In some embodiments, playbook engines may be arranged to format analysis playbooks as structured investigation directives, agent prompts, evaluation criteria, data collection specifications, automated analysis instructions, or the like that analysis engines may execute using management agents, action agents, generative AI systems, external evaluation services, or the like. In some embodiments, playbook engines may be configured to include one or more of investigation priorities, resource allocation parameters, timeout configurations, error handling procedures, progress monitoring requirements, or the like within analysis playbooks to enable systematic investigation execution. Accordingly, in some embodiments, analysis engines may be arranged to execute various actions based on the analysis playbooks, including instantiating appropriate agents, configuring investigation parameters, establishing data collection pipelines, initializing evaluation services, beginning automated investigation processes, or the like based on instructions or directives included in playbooks.

At decision block 1010, in one or more of the various embodiments, if there may be heritage playbooks, control may flow to block 1012; otherwise, control may flow to decision block 1014.

In some embodiments, playbook engines may be arranged to evaluate if heritage playbooks or heritage playbook sections may be relevant to the current investigation based on event classifications, organizational policies, compliance requirements, investigation findings, user-configured matching criteria, or the like.

In some embodiments, heritage playbook identification may include analyzing event characteristics against heritage playbook metadata, evaluating organizational procedural requirements, assessing regulatory compliance obligations, or the like. Also, in some embodiments, playbook engines may be arranged to determine if legacy investigation procedures should be incorporated into the automated analysis process. Accordingly, in some embodiments, playbook engines may be configured to query heritage playbook repositories, evaluate relevance scores, apply organizational priority rankings, assess heritage playbook effectiveness metrics, or the like to determine if heritage procedures should augment the current investigation.

At block 1012, in one or more of the various embodiments, playbook engines may be arranged to update the analysis playbooks based on one or more heritage playbooks.

In some embodiments, playbook engines may be arranged to incorporate relevant heritage playbook sections into analysis playbooks based on evaluations that may identify one or more complementary procedures, eliminate one or more redundant actions, resolve one or more conflicting requirements, translate one or more natural language instructions, optimize investigation workflows, or the like.

In some embodiments, playbook engines may be arranged to perform deduplication analysis between heritage playbooks or analysis playbooks, consolidate similar procedures into unified directives, generate agent prompts based on heritage procedures, map heritage requirements to automated analysis actions, adapt legacy instructions for integration with automated investigation systems, or the like. Accordingly, in some embodiments, updated analysis playbooks may provide an investigation framework that may combine automated analysis capabilities with organizational heritage knowledge, procedural requirements, compliance obligations, regulatory mandates, or the like to ensure thorough security investigations.

At decision block 1014, in one or more of the various embodiments, if the pending investigation may be complete, control may flow to block 1016; otherwise, control may loop back to block 1006.

In some embodiments, playbook engines may be arranged to evaluate investigation completion status based on analysis progress indicators, evidence collection metrics, threat assessment completeness, compliance verification results, investigation objective fulfillment criteria, or the like that may be declared in analysis playbooks. In some embodiments, investigation completion assessment may include determining if sufficient evidence has been collected, threat indicators have been evaluated, compliance requirements have been satisfied, organizational procedures have been executed, investigation conclusions can be formulated, or the like. Accordingly, in some embodiments, if investigations require additional analysis, supplemental evidence collection, expanded heritage playbook incorporation, or enhanced threat assessment procedures, playbook engines may be configured to iteratively update analysis playbooks or incorporate additional heritage procedures to ensure comprehensive investigation coverage.

At block 1016, in one or more of the various embodiments, analysis engines may be arranged to generate an investigation report based on the results of the investigation. In some embodiments, analysis engines may be arranged to generate comprehensive investigation reports that may include one or more of threat assessments, evidence documentation, risk evaluations, compromise indicators, attack vector analysis, affected system inventories, heritage playbook execution results, compliance verification status, recommended mitigation actions, or the like based on investigation results. In some embodiments, investigation reports may be formatted as machine-readable data structures, interactive dashboards, executive summaries, technical analysis documents, compliance audit trails, regulatory filing reports, or the like depending on organizational requirements, reporting obligations, or other local circumstances. Thus, in some embodiments, investigation reports may provide detailed documentation of both automated analysis processes or heritage procedure execution while ensuring a broad and deep investigation scope or organizational procedural compliance.

Next, in one or more of the various embodiments, control may be returned to a calling process.

Figure 11:
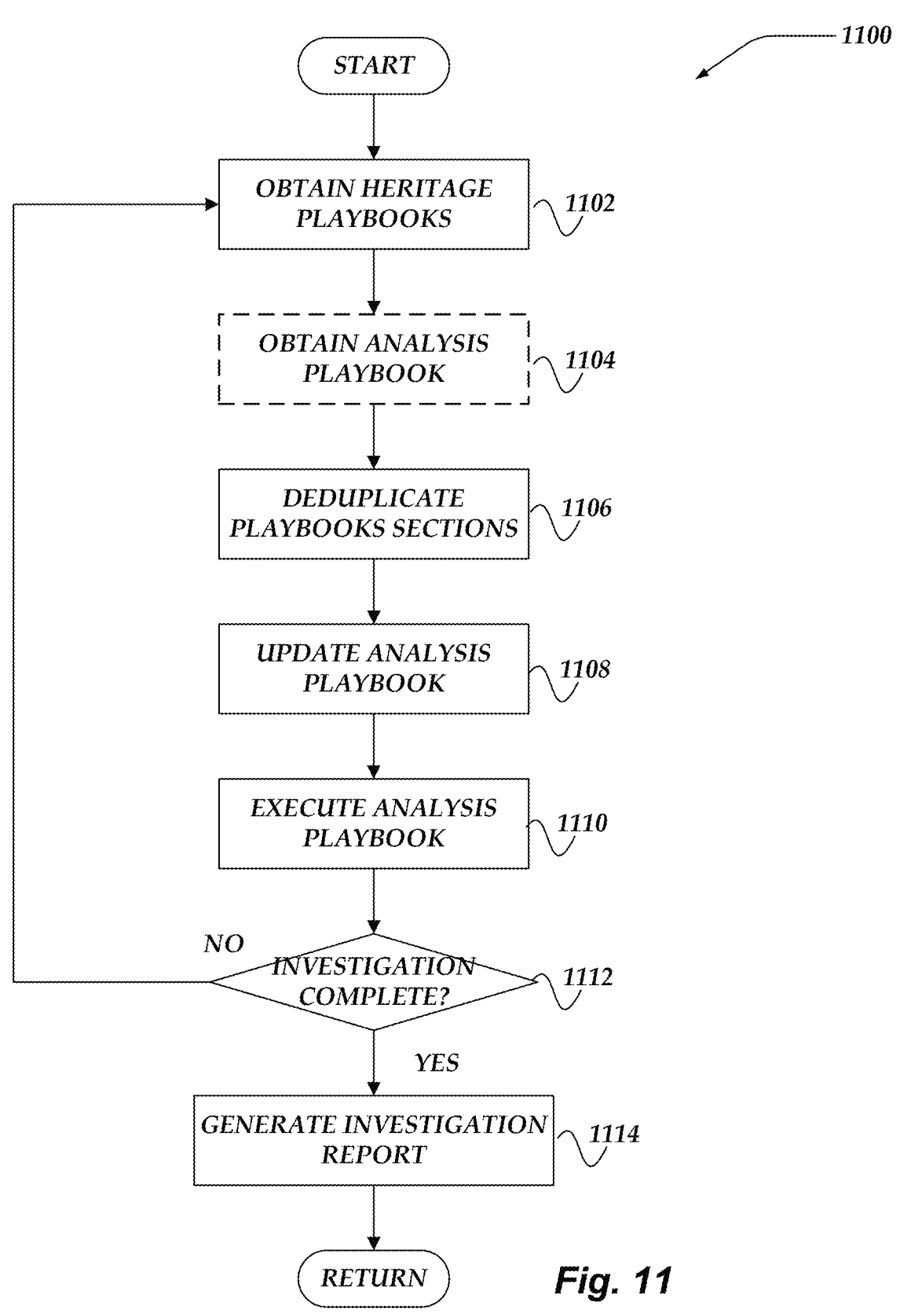
FIG. 11 illustrates a flowchart of a process for dynamic playbooks for security investigations in accordance with one or more of the various embodiments.

FIG. 11 illustrates a flowchart of process 1100 for dynamic playbooks for security investigations in accordance with one or more of the various embodiments. After a start block, at block 1102, in one or more of the various embodiments, playbook engines may be arranged to obtain one or more heritage playbooks. In some embodiments, playbook engines may be arranged to identify or retrieve relevant heritage playbooks from heritage playbook repositories based on event characteristics, organizational policies, compliance requirements, investigation scope, matching criteria established by authorized users, or the like. In some embodiments, heritage playbooks may include pre-existing organizational procedures, legacy investigation checklists, compliance frameworks, manual response protocols, regulatory requirements, operational runbooks, industry best practices that organizations have developed prior to deploying automated investigation systems, or the like. Accordingly, in some embodiments, playbook engines may be configured to evaluate heritage playbook relevance using pattern matching algorithms, natural language processing techniques, similarity scoring mechanisms, machine learning classifiers, generative AI systems, or the like to determine which heritage playbooks or heritage playbook sections (if any) may be applicable to current investigations. In some embodiments, playbook engines may be arranged to assess heritage playbook effectiveness metrics, organizational priority rankings, compliance mandates, user feedback scores to prioritize heritage playbook selection, or the like for integration into analysis workflows.

At block 1104, in one or more of the various embodiments, optionally, playbook engines may be arranged to obtain an analysis playbook. In some embodiments, playbook engines may be arranged to retrieve existing analysis playbooks from playbook repositories, generate initial analysis playbooks based on event classifications, access partial analysis playbooks from ongoing investigations, or the like that may require heritage playbook augmentation.

In some embodiments, analysis playbooks may include machine-readable investigation directives, agent prompts for generative AI systems, evaluation criteria for threat assessment, data collection strategies, analysis methodologies, reporting requirements, or escalation procedures designed for specific event types or threat categories. Accordingly, in some embodiments, playbook engines may be configured to evaluate analysis playbook completeness, identify gaps in investigation coverage, assess resource allocation requirements, or determine if heritage playbook integration may enhance investigation effectiveness.

Note, this block is indicated as being optional because in some cases for some embodiments an analysis playbook or partial analysis playbook may not be available yet.

At block 1106, in one or more of the various embodiments, playbook engines may be arranged to deduplicate one or more playbook sections from the heritage playbooks or the analysis playbook. In some embodiments, playbook engines may be arranged to identify one or more of redundant investigation actions, overlapping procedural requirements, duplicate data collection tasks, conflicting analysis directives, or the like that may be between heritage playbooks or analysis playbooks through systematic comparison of the various heritage playbook sections to analysis playbook sections. In some embodiments, deduplication analysis may include comparing investigation objectives, evaluation targets, data collection requirements, analysis methodologies, reporting criteria, procedural elements, or the like using natural language processing algorithms, similarity analysis techniques, pattern matching methods, semantic comparison, or the like. tools. Accordingly, in some embodiments, playbook engines may be configured to consolidate similar procedures into unified directives, eliminate duplicate investigation steps, resolve conflicting requirements, or optimize investigation workflows to reduce redundant resource allocation or contradictory analysis actions. In some embodiments, playbook engines may be arranged to preserve critical investigation steps while removing unnecessary duplication to ensure a comprehensive yet efficient investigation coverage.

At block 1108, in one or more of the various embodiments, playbook engines may be arranged to update the analysis playbook based on heritage playbooks. In some embodiments, playbook engines may be arranged to incorporate relevant heritage playbook sections into analysis playbooks using integration processes that may translate natural language heritage instructions into machine-readable investigation directives, generate agent prompts based on heritage procedures, map heritage requirements to automated analysis actions, or adapt legacy instructions for compatibility with automated investigation conducted by analysis engines. In some embodiments, playbook engines may be configured to maintain heritage playbook profiles that track effectiveness metrics, cost-benefit ratios, success rates, organizational value contributions, or user feedback scores for one or more heritage playbook sections. Accordingly, in some embodiments, updated analysis playbooks may represent investigation frameworks that combine automated analysis capabilities with organizational heritage knowledge, procedural requirements, compliance obligations, regulatory mandates, industry best practices, or the like to ensure thorough security investigations while executing heritage investigative actions that may be mandated or preferred by organizations.

At block 1110, playbook engines may be arranged to provide the updated analysis playbooks to an analysis engine to proceed with or continue the investigation of the events. In some embodiments, playbook engines may be arranged to format updated analysis playbooks as structured investigation directives, agent prompts, evaluation criteria, data collection specifications, automated analysis instructions, or procedural guidance that analysis engines may execute using management agents, action agents, generative AI systems, external evaluation services, or the like. In some embodiments, playbook engines may be configured to include investigation priorities, resource allocation parameters, timeout configurations, error handling procedures, progress monitoring requirements, or heritage procedure compliance verification within updated analysis playbooks to ensure systematic investigation execution. Accordingly, in some embodiments, analysis engines may be arranged to instantiate appropriate agents, configure investigation parameters, establish data collection pipelines, initialize evaluation services, execute heritage procedure requirements, continue automated investigation processes, or the like based on updated playbook specifications that incorporate both automated capabilities or organizational procedural knowledge.

At decision block 1112, in one or more of the various embodiments, if the investigation may be complete, control may flow to block 1114; otherwise, control may loop back to block 1102. In some embodiments, playbook engines may be arranged to evaluate investigation completion status based on analysis progress indicators, evidence collection metrics, threat assessment completeness, compliance verification results, heritage procedure execution status, or investigation objective fulfillment criteria established within updated analysis playbooks. In some embodiments, investigation completion assessment may include determining if sufficient evidence has been collected, threat indicators have been evaluated, compliance requirements have been satisfied, organizational procedures have been executed, heritage playbook requirements have been fulfilled, or investigation conclusions can be formulated. Accordingly, in some embodiments, if investigations require additional heritage playbook integration, supplemental evidence collection, expanded procedural coverage, enhanced threat assessment procedures, or iterative playbook refinement, playbook engines may be configured to loop back to obtain additional heritage playbooks or further update analysis playbooks.

At block 1114, in one or more of the various embodiments, analysis engines may be arranged to generate an investigation report based on the results of the investigation of the event. In some embodiments, analysis engines may be arranged to compile comprehensive investigation reports that include threat assessments, evidence documentation, risk evaluations, compromise indicators, attack vector analysis, affected system inventories, heritage playbook execution results, procedural compliance verification, organizational requirement fulfillment, or recommended mitigation actions based on investigation findings. In some embodiments, investigation reports may be formatted as machine-readable data structures, interactive dashboards, executive summaries, technical analysis documents, compliance audit trails, regulatory filing reports, or procedural documentation depending on organizational requirements, stakeholder needs, reporting obligations, or governance frameworks. Thus, in some embodiments, investigation reports may provide detailed documentation of both automated analysis processes or heritage procedure execution while demonstrating comprehensive investigation coverage, organizational procedural compliance, or regulatory requirement satisfaction.

Figure 12:
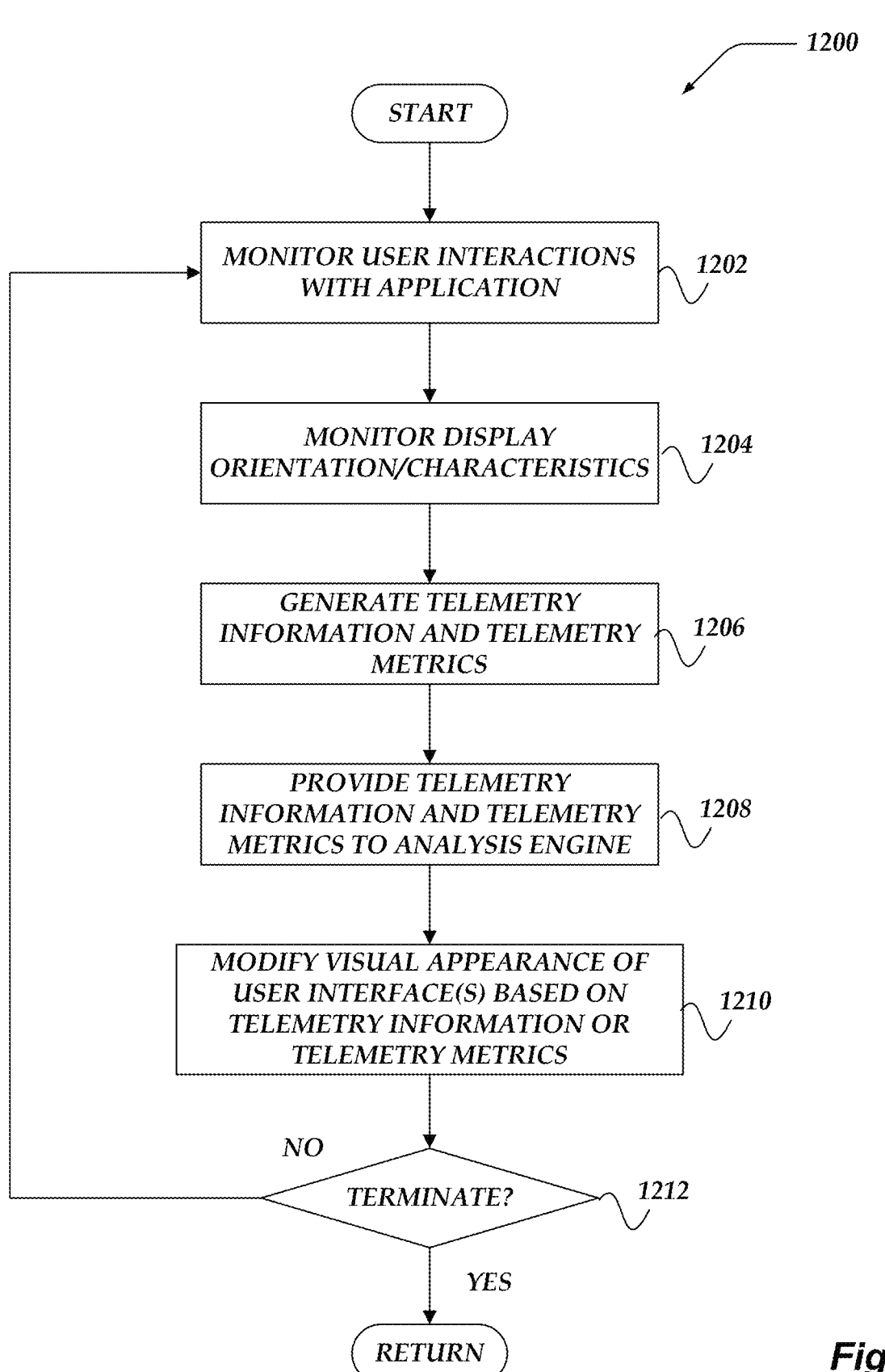
FIG. 12 illustrates a flowchart of a process for collecting and applying telemetry information and telemetry metrics for dynamic playbooks for security investigations in accordance with one or more of the various embodiments.

FIG. 12 illustrates a flowchart of process 1200 for collecting and applying telemetry information and telemetry metrics for dynamic playbooks for security investigations in accordance with one or more of the various embodiments. After a start block, at block 1202, in one or more of the various embodiments, telemetry engines may be arranged to monitor one or more user interactions with one or more applications. As described above, telemetry engines may be arranged to monitor or track how users may physically interact with one or more user interfaces associated with the one or more applications. In some embodiments, user interactions may include active interactions associated with user activity or passive interactions associated with user inactivity. Also, in one or more embodiments, various types of collected user telemetry may be based on a user's selection or non-selection of one or more particular elements or content in a display panel, pointing device (mouse) hover time over particular content or elements in a display panel, user dwell time between actions in a display panel, dwell time for viewing a display panel by a user, and the like. Also, in some embodiments, telemetry engines may be arranged to track mouse movement, eye movement, keystrokes, or the like, to determine how users may interact with information displayed in user interfaces. See, description for FIG. 4 or FIG. 8 for additional details.

At block 1204, in one or more of the various embodiments, telemetry engines may be arranged to monitor one or more display characteristics or display orientation characteristics.

As described above, in some embodiments, telemetry engines may be arranged to monitor various display characteristics employed for displaying the user interfaces, including the size/type of display, screen resolution, screen orientation, number of active displays, screen brightness, refresh rate, aspect ratio, color dynamic range, windowed or full screen modes, or the like. In some embodiments, screens, monitors, or operating systems may provide interfaces or APIs that enable telemetry engines to obtain information about the current state or status of the display screen.

In some cases, for some embodiments, operating systems or other services may be configured to actively notify telemetry engines if one or more screen characteristics may change.

At block 1206, in one or more of the various embodiments, telemetry engines may be arranged to generate telemetry information or one or more telemetry metrics. In some embodiments, the monitored interactions or display characteristics may be represented as telemetry information or telemetry metrics. The particular format of the telemetry information or telemetry metrics may vary depending on the type interactions or characteristics being represented. Accordingly, in some embodiments, telemetry information or telemetry metrics may be included in one or more data structures that may be communicated to other applications or services. For example, in some embodiments, telemetry information or telemetry metrics may be represented using key-value pair data structures that include a key field representing the label or type of metric and a value field that represents the value of the metric.

At block 1208, in one or more of the various embodiments, telemetry engines may be arranged to provide the telemetry information and telemetry metrics to a runtime engine.

In some embodiments, telemetry engines may be arranged to provide one or more interfaces or APIs that enable other applications or services, such as analysis engines, playbook engines, or the like, to gain access to the telemetry information or telemetry metrics. In some embodiments, telemetry engines may be configured to push some or all of the telemetry information or telemetry metrics to one or more subscribing application or services. Also, in some embodiments, telemetry engines may be configured to enable other application or services to poll or otherwise request-on-demand some or all of the telemetry information or telemetry metrics.

At block 1210, in one or more of the various embodiments, analysis engines or playbook 5 engines may be arranged to modify the visual appearance of one or more user interfaces based on the telemetry information or telemetry metrics.

Accordingly, in some embodiments, analysis engines or playbook engines may be arranged to dynamically change the visual appearance of the one or more user interfaces to improve the efficiency and effectiveness of the user interfaces based on some or all of the telemetry information or telemetry metrics. For example, analysis engines may be arranged to dynamically select, position, size, shape, remove, hide, inactivate, disable, highlight, or style one or more visual user interface components such as display panels, controls, elements, or content based on, among other things, one or more telemetry metrics. For example, if telemetry information or telemetry metrics indicate that users are focusing on or navigating to particular user interface views, components or user interface panels, analysis engines or playbook engines may be arranged to highlight or size the preferred user interface elements or display panels. For example, if users are determined to rarely interact with a particular display panel, playbook engines may be arranged to reduce the size, diminish the shape, disable its controls, and re-position that display panel to improve the efficiency of display screen usage. See, also FIG. 8 and its description.

At decision block 1212, in one or more of the various embodiments, if the telemetry engine, analysis engine, or playbook engine may be terminated, control may be returned to a calling process; otherwise, control may loop back to block 1202. In some embodiments, telemetry engines may be arranged to continuously or periodically provide updated/current telemetry information or telemetry metrics to enable analysis engines or playbook engine engines to dynamically change the visual appearance of the one or more user interfaces. Accordingly, in some embodiments, process 1200 may continue operation until it may be explicitly terminated or the operation of the associated analysis engines or playbook engines may be terminated.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of these innovations.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of these innovations.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing activity in a computing environment using one or more processors to execute instructions that are configured to cause actions, comprising:

obtaining one or more events associated with activity in the computing environment;

collecting one or more heritage playbooks based on one or more characteristics of the one or more events, wherein each heritage playbook includes one or more heritage instructions for investigating the one or more events;

obtaining an analysis playbook based on an analysis of the one or more events, wherein the analysis playbook includes one or more analysis instructions to automatically investigate the one or more events;

obtaining an updated analysis playbook based on the analysis playbook and one or more portions of the one or more heritage playbooks, wherein the one or more portions of the one or more heritage playbooks are included in the updated analysis playbook;

executing an investigation of the one or more events based on the updated analysis playbook, wherein one or more actions are executed based on the one or more portions of the one or more heritage playbooks; and obtaining a user interface that includes one or more display panels for content that includes one or more of an investigation report, a recommendation, or other information associated with the one or more events, wherein the content is dynamically transformed and arranged for display to a user based on one or more of user interaction telemetry, user feedback or telemetry metrics.

2. The method of claim 1, wherein obtaining the updated analysis playbook, further comprises: obtaining one or more enhanced prompts that include one or more heritage playbook sections and one or more analysis instructions, wherein the one or more enhanced prompts include one or more of a threat assessment template, an investigation guidance framework, or an analytical reasoning structure; and using the one or more enhanced prompts with one or more generative artificial intelligence models to obtain one or more investigation directives for the updated analysis playbook.

3. The method of claim 1, wherein collecting the one or more heritage playbooks, further comprises:

obtaining a plurality of heritage playbooks from one or more sources including one or more of a legacy incident response document, a compliance framework repository, a security team checklist database, or a regulatory requirement documentation system; and collecting the one or more heritage playbooks from the plurality of heritage playbooks based on the one or more characteristics of the one or more events based on one or more relevance assessments.

4. The method of claim 1, further comprising:

collecting one or more duplicate heritage instructions based on similarity analysis between the one or more heritage playbooks and the analysis playbook, wherein the one or more duplicate heritage instructions include one or more of a redundant investigation step, an overlapping data collection requirement, or a repetitive analysis directive; and deduplicating the one or more duplicated heritage instructions.

5. The method of claim 1, wherein obtaining the updated analysis playbook, further comprises: translating one or more natural language heritage instructions from the one or more heritage playbooks into machine-readable investigation directives using one or more of a natural language processing action or a generative artificial intelligence model; and obtaining one or more agent prompts based on the translated heritage instructions for integration into the investigation of the one or more events.

6. The method of claim 1, further comprising:

obtaining one or more heritage playbook value profiles that track effectiveness metrics for one or more sections of the one or more heritage playbooks, wherein the one or more heritage playbook value profiles include one or more of an execution success rate, a cost-benefit ratio, an investigation contribution score, or a user feedback rating; and using the one or more heritage playbook value profiles to prioritize inclusion of the one or sections of the more heritage playbooks in the updated analysis playbook.

7. The method of claim 1, further comprising:

collecting one or more heritage playbook evaluation criteria that include one or more of an age threshold, a usage frequency metric, user satisfaction score, or a compliance requirement indicator; and using the one or more heritage playbook evaluation criteria to identify one or more heritage playbook sections that are eligible to include in the analysis playbook.

8. The method of claim 1, further comprising:

obtaining one or more heritage playbook versioning systems to track modifications and evolution of heritage playbook content over time, wherein the one or more heritage playbook versioning systems include one or more of a change history record, a rollback capability, or a concurrent modification management feature; and using the one or more heritage playbook versioning systems to maintain consistency between heritage playbook sources and integrated analysis playbook content.

9. A network computer for managing activity in a computing environment, comprising:

a memory that stores at least instructions; and one or more processors that execute instructions that are configured to cause actions, including:

obtaining one or more events associated with activity in the computing environment;

collecting one or more heritage playbooks based on one or more characteristics of the one or more events, wherein each heritage playbook includes one or more heritage instructions for investigating the one or more events;

obtaining an analysis playbook based on an analysis of the one or more events, wherein the analysis playbook includes one or more analysis instructions to automatically investigate the one or more events;

obtaining an updated analysis playbook based on the analysis playbook and one or more portions of the one or more heritage playbooks, wherein the one or more portions of the one or more heritage playbooks are included in the updated analysis playbook;

executing an investigation of the one or more events based on the updated analysis playbook, wherein one or more actions are executed based on the one or more portions of the one or more heritage playbooks; and obtaining a user interface that includes one or more display panels for content that includes one or more of an investigation report, a recommendation, or other information associated with the one or more events, wherein the content is dynamically transformed and arranged for display to a user based on one or more of user interaction telemetry, user feedback or telemetry metrics.

10. The network computer of claim 9, wherein obtaining the updated analysis playbook, further comprises:

obtaining one or more enhanced prompts that include one or more heritage playbook sections and one or more analysis instructions, wherein the one or more enhanced prompts include one or more of a threat assessment template, an investigation guidance framework, or an analytical reasoning structure; and using the one or more enhanced prompts with one or more generative artificial intelligence models to obtain one or more investigation directives for the updated analysis playbook.

11. The network computer of claim 9, wherein collecting the one or more heritage playbooks, further comprises:

obtaining a plurality of heritage playbooks from one or more sources including one or more of a legacy incident response document, a compliance framework repository, a security team checklist database, or a regulatory requirement documentation system; and collecting the one or more heritage playbooks from the plurality of heritage playbooks based on the one or more characteristics of the one or more events based on one or more relevance assessments.

12. The network computer of claim 9, wherein the one or more processors execute instructions that are configured to cause actions, further comprising:

collecting one or more duplicate heritage instructions based on similarity analysis between the one or more heritage playbooks and the analysis playbook, wherein the one or more duplicate heritage instructions include one or more of a redundant investigation step, an overlapping data collection requirement, or a repetitive analysis directive; and deduplicating the one or more duplicated heritage instructions.

13. The network computer of claim 9, wherein obtaining the updated analysis playbook, further comprises:

translating one or more natural language heritage instructions from the one or more heritage playbooks into machine-readable investigation directives using one or more of a natural language processing action or a generative artificial intelligence model; and obtaining one or more agent prompts based on the translated heritage instructions for integration into the investigation of the one or more events.

14. The network computer of claim 9, wherein the one or more processors execute instructions that are configured to cause actions, further comprising:

obtaining one or more heritage playbook value profiles that track effectiveness metrics for one or more sections of the one or more heritage playbooks, wherein the one or more heritage playbook value profiles include one or more of an execution success rate, a cost-benefit ratio, an investigation contribution score, or a user feedback rating; and using the one or more heritage playbook value profiles to prioritize inclusion of the one or sections of the more heritage playbooks in the updated analysis playbook.

15. The network computer of claim 9, wherein the one or more processors execute instructions that are configured to cause actions, further comprising:

collecting one or more heritage playbook evaluation criteria that include one or more of an age threshold, a usage frequency metric, user satisfaction score, or a compliance requirement indicator; and using the one or more heritage playbook evaluation criteria to identify one or more heritage playbook sections that are eligible to include in the analysis playbook.

16. The network computer of claim 9, wherein the one or more processors execute instructions that are configured to cause actions, further comprising:

obtaining one or more heritage playbook versioning systems to track modifications and evolution of heritage playbook content over time, wherein the one or more heritage playbook versioning systems include one or more of a change history record, a rollback capability, or a concurrent modification management feature; and using the one or more heritage playbook versioning systems to maintain consistency between heritage playbook sources and integrated analysis playbook content.

17. A processor readable non-transitory storage media that includes instructions configured for managing activity in a computing environment, wherein execution of the instructions by one or more processors on one or more network computers performs actions, comprising:

obtaining one or more events associated with activity in the computing environment;

collecting one or more heritage playbooks based on one or more characteristics of the one or more events, wherein each heritage playbook includes one or more heritage instructions for investigating the one or more events;

obtaining an analysis playbook based on an analysis of the one or more events, wherein the analysis playbook includes one or more analysis instructions to automatically investigate the one or more events;

obtaining an updated analysis playbook based on the analysis playbook and one or more portions of the one or more heritage playbooks, wherein the one or more portions of the one or more heritage playbooks are included in the updated analysis playbook;

executing an investigation of the one or more events based on the updated analysis playbook, wherein one or more actions are executed based on the one or more portions of the one or more heritage playbooks; and obtaining a user interface that includes one or more display panels for content that includes one or more of an investigation report, a recommendation, or other information associated with the one or more events, wherein the content is dynamically transformed and arranged for display to a user based on one or more of user interaction telemetry, user feedback or telemetry metrics.

18. The media of claim 17, wherein obtaining the updated analysis playbook, further comprises: obtaining one or more enhanced prompts that include one or more heritage playbook sections and one or more analysis instructions, wherein the one or more enhanced prompts include one or more of a threat assessment template, an investigation guidance framework, or an analytical reasoning structure; and using the one or more enhanced prompts with one or more generative artificial intelligence models to obtain one or more investigation directives for the updated analysis playbook.

19. The media of claim 17, wherein collecting the one or more heritage playbooks, further comprises:

obtaining a plurality of heritage playbooks from one or more sources including one or more of a legacy incident response document, a compliance framework repository, a security team checklist database, or a regulatory requirement documentation system; and collecting the one or more heritage playbooks from the plurality of heritage playbooks based on the one or more characteristics of the one or more events based on one or more relevance assessments.

20. The media of claim 17, wherein execution of the instructions by the one or more processors on the one or more network computers performs actions, further comprising:

collecting one or more duplicate heritage instructions based on similarity analysis between the one or more heritage playbooks and the analysis playbook, wherein the one or more duplicate heritage instructions include one or more of a redundant investigation step, an overlapping data collection requirement, or a repetitive analysis directive; and deduplicating the one or more duplicated heritage instructions.

\* \* \* \* \*